(12) United States Patent
Yamamuro et al.

(10) Patent No.: US 12,316,789 B2
(45) Date of Patent: May 27, 2025

(54) DATA MANAGEMENT APPARATUS AND DATA MANAGEMENT METHOD

(71) Applicants: TOYOTA JIDOSHA KABUSHIKI KAISHA, Toyota (JP); SCALAR, INC., Tokyo (JP)

(72) Inventors: Naoki Yamamuro, Nagoya (JP); Wataru Fukatsu, Tokyo (JP)

(73) Assignees: TOYOTA JIDOSHA KABUSHIKI KAISHA, Toyota (JP); SCALAR, INC., Tokyo (JP)

( * ) Notice: Subject to any disclaimer, the term of this patent is extended or adjusted under 35 U.S.C. 154(b) by 251 days.

(21) Appl. No.: 17/972,862

(22) Filed: Oct. 25, 2022

(65) Prior Publication Data
US 2023/0155848 A1 May 18, 2023

(30) Foreign Application Priority Data

Sep. 22, 2021 (JP) .................................. 2021-154132

(51) Int. Cl.
H04L 29/06 (2006.01)
H04L 9/00 (2022.01)
H04L 9/32 (2006.01)

(52) U.S. Cl.
CPC .............. *H04L 9/50* (2022.05); *H04L 9/3213* (2013.01); *H04L 9/3297* (2013.01)

(58) Field of Classification Search
CPC ........ H04L 9/3297; H04L 9/50; H04L 9/3213
See application file for complete search history.

(56) References Cited

U.S. PATENT DOCUMENTS

| 10,282,558 B2* | 5/2019 | Chan ....................... G06F 21/64 |
| 2022/0123991 A1 | 4/2022 | Yamada |
| 2023/0163970 A1* | 5/2023 | Riggan ................. H04L 9/3218 |
| | | 713/168 |

FOREIGN PATENT DOCUMENTS

| EP | 3 832 510 A1 | 6/2021 |
| JP | 6694204 B1 | 5/2020 |
| WO | 2019/228560 A2 | 12/2019 |
| WO | 2020/055413 A1 | 3/2020 |

OTHER PUBLICATIONS

Gipp et al., "Decentralized Trusted Timestamping using the Currency Bitcoin," arxiv.org, Cornell University Library, Ithaca, NY, Feb. 13, 2015.

* cited by examiner

*Primary Examiner* — Tri M Tran
(74) *Attorney, Agent, or Firm* — Oliff PLC

(57) ABSTRACT

When a second operation to simultaneously update component data D12 to component data D13 and update component data D21 to component data D22 is performed, a controller of a client server creates a record RA3 including a hash value of the component data D13 in a distributed ledger which is a first proof chain and creates a record RB2 including a hash value of the component data D22 in a distributed ledger which is a second proof chain. The controller generates a terminal hash value including a record hash value of the record RA3 and a record hash value of the record RB2 and obtains a time stamp token for the terminal hash value.

8 Claims, 20 Drawing Sheets

FIG.2

DISTRIBUTED LEDGER SET 50

DISTRIBUTED LEDGER 51

| Key | Age | Obj-HV | Nonce | Sig. | Prev-HV | HV |
|---|---|---|---|---|---|---|
| k1 | 0 | OH1 | ... | ... | ... | H1 |
| k1 | 1 | OH2 | ... | ... | H1 | H2 |
| k1 | 2 | OH3 | ... | ... | H2 | H3 |

DISTRIBUTED LEDGER 52

| Key | Age | Obj-HV | Nonce | Sig. | Prev-HV | HV |
|---|---|---|---|---|---|---|
| k2 | 0 | OHa | ... | ... | ... | Ha |
| k2 | 1 | OHb | ... | ... | Ha | Hb |

FIG.4

DISTRIBUTED LEDGER SET 50

DISTRIBUTED LEDGER 51

| Key | Age | Obj-HV | Nonce | Sig | Prev-HV | HV |
|-----|-----|--------|-------|-----|---------|-----|
| k1  | 0   | OH1    | ...   | ... | ...     | H1  |
| k1  | 1   | OH2    | ...   | ... | H1      | H2  |
| k1  | 2   | OH3    | ...   | ... | H2      | H3  |
| k1  | 3   | OH4    | ...   | ... | H3      | H4  |

DISTRIBUTED LEDGER 52

| Key | Age | Obj-HV | Nonce | Sig | Prev-HV | HV |
|-----|-----|--------|-------|-----|---------|-----|
| k2  | 0   | OHa    | ...   | ... | ...     | Ha  |
| k2  | 1   | OHb    | ...   | ... | Ha      | Hb  |
| k2  | 2   | OHc    | ...   | ... | Hb      | Hc  |
| k2  | 3   | TM     | ...   | ... | Hc      | Hd  |

FIG.12

DISTRIBUTED LEDGER SET 55

DISTRIBUTED LEDGER 56

| Key | Age | Obj-HV | Nonce | Sig | Prev-HV | HV |
|---|---|---|---|---|---|---|
| k1 | 0 | OH1 | ... | ... | ... | H1 |
| k1 | 1 | OH2 | ... | ... | H1 | H2 |
| k1 | 2 | OH3 | ... | ... | H2 | H3 |
| k1 | 3 | OH4 | ... | ... | H3 | H4 |

DISTRIBUTED LEDGER 57

| Key | Age | Obj-HV | Nonce | Sig | Prev-HV | HV |
|---|---|---|---|---|---|---|
| k2 | 0 | OHa | ... | ... | ... | Ha |
| k2 | 1 | OHb | ... | ... | Ha | Hb |
| k2 | 2 | OHc | ... | ... | Hb | Hc |

FIG.17

LEDGER SET 60

LEDGER 67

| Key | Age | Obj-HV | Nonce | Sig | Prev-HV | HV |
|---|---|---|---|---|---|---|
| k1 | 0 | OH1 | ... | ... | ... | H1 |
| k1 | 1 | OH2 | ... | ... | H1 | H2 |
| k1 | 2 | OH3 | ... | ... | H2 | H3 |
| k1 | 3 | OH4 | ... | ... | H3 | H4 |

LEDGER 68

| Key | Age | Obj-HV | Nonce | Sig | Prev-HV | HV |
|---|---|---|---|---|---|---|
| k2 | 0 | OHa | ... | ... | ... | Ha |
| k2 | 1 | OHb | ... | ... | Ha | Hb |
| k2 | 2 | OHc | ... | ... | Hb | Hc |
| k2 | 3 | TM | ... | ... | Hc | Hd |

FIG.18

SUSPENSION TABLE

| Key | Nonce |
|-----|-------|
| k1  | ...   |

FIG.19

COMMIT TABLE 374

| Key | Age | Obj-HV | Nonce | Sig | Prev-HV | HV |
|---|---|---|---|---|---|---|
| k1 | 0 | OH1 | ... | ... | ... | H1 |
| k1 | 1 | OH2 | ... | ... | H1 | H2 |
| k1 | 2 | OH3 | ... | ... | H2 | H3 |
| k1 | 3 | OH4 | ... | ... | H3 | H4 |

COMMIT DATA 375

| Key | Age | Obj-HV | Nonce | Sig | Prev-HV | HV |
|---|---|---|---|---|---|---|
| k2 | 0 | OHa | ... | ... | ... | Ha |
| k2 | 1 | OHb | ... | ... | Ha | Hb |
| k2 | 2 | OHc | ... | ... | Hb | Hc |
| k2 | 3 | TM | ... | ... | Hc | Hd |

COMMIT DATA 376

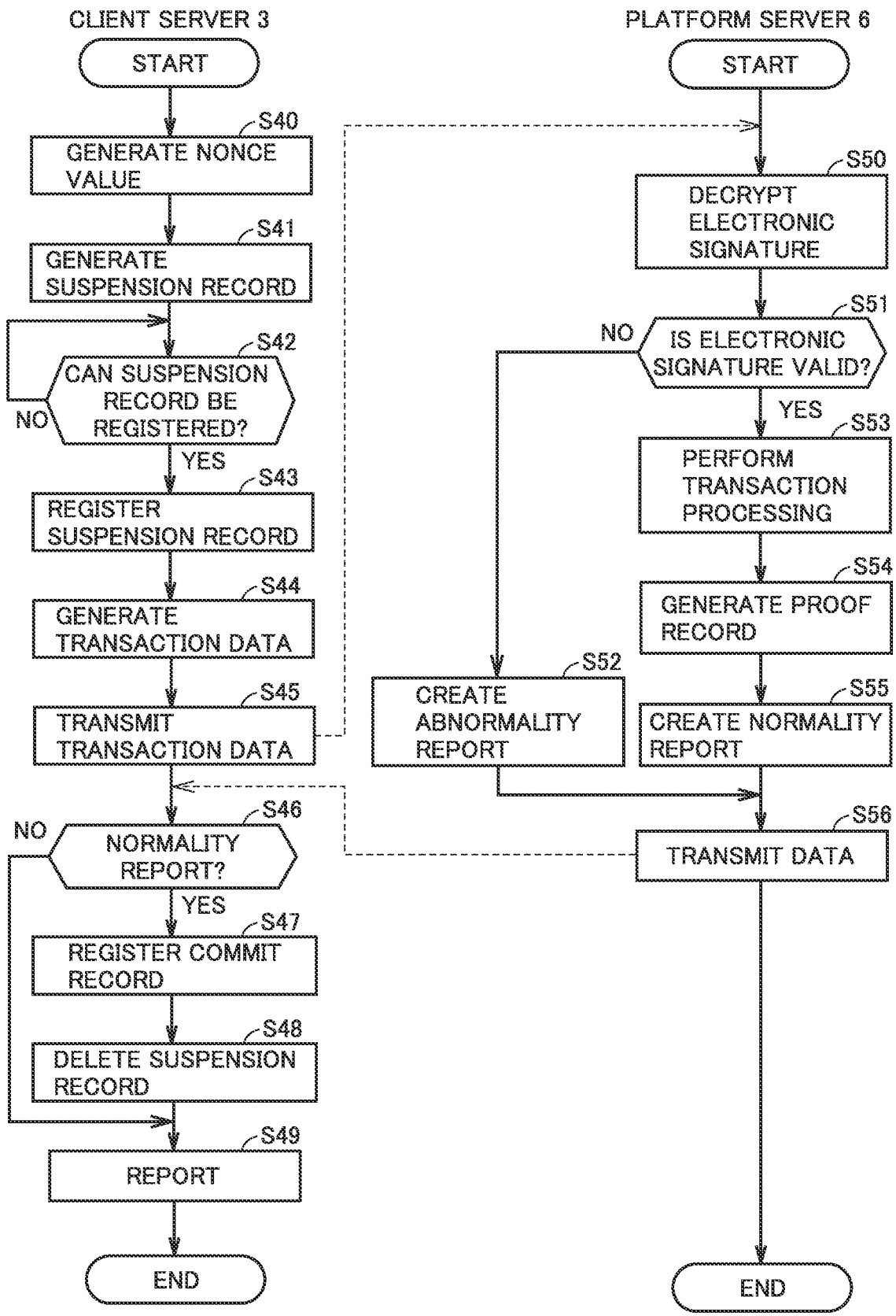

DATA MANAGEMENT APPARATUS AND DATA MANAGEMENT METHOD

BACKGROUND

Field

The present disclosure relates to a data management apparatus and a data management method for managing data based on a distributed ledger technology.

Description of the Background Art

Japanese Patent No. 6694204 discloses a data management system that manages information for each ID by configuring a distributed ledger (asset) having a directed acyclic graph (DAG) structure for each Key (ID) for identifying a management target.

In the data management system disclosed in Japanese Patent No. 6694204, for example, as data to be managed with a certain ID is updated, data is added to an asset prepared for that certain ID. For a target managed with another ID as well, as data to be managed with that another ID is updated, data is added to an asset prepared for that another ID.

In order to prove time of existence of data added to each asset, a time stamp token may be obtained for a latest asset record each time each asset is updated. Such a configuration that a time stamp token is obtained for each asset, however, may lead to increase in cost for obtaining the time stamp token or increase in load imposed on the system.

SUMMARY

The present disclosure was made to solve problems above, and an object of the present disclosure is to facilitate, in a system including a plurality of distributed ledgers, proof of time of existence of data stored in the plurality of distributed ledgers.

(1) A data management apparatus according to one aspect of the present disclosure is a data management apparatus that manages data based on a distributed ledger technology. The data management apparatus includes a storage device where a distributed ledger is stored, in the distributed ledger, a record including information on the data being stored in a time-series manner, a controller that adds the record to the distributed ledger, and a communication apparatus configured to communicate with a time stamp authority. The data includes first data and second data. The distributed ledger includes a first distributed ledger where a record including first information on the first data is stored in a time-series manner and a second distributed ledger where a record including second information on the second data is stored in a time-series manner. The controller generates a terminal value including information on a record at a terminal in the first distributed ledger and information on a record at a terminal in the second distributed ledger and obtains a time stamp token for the terminal value from the time stamp authority through the communication apparatus.

According to the configuration, a time stamp token for the terminal value including the information on the record at the terminal in the first distributed ledger and the information on the record at the terminal in the second distributed ledger is obtained. By obtaining the time stamp token for the terminal value, proof of existence of the first information stored in the first distributed ledger and the second information stored in the second distributed ledger at the time indicated by the time stamp token can collectively be obtained.

(2) In one embodiment, the controller causes a record including the time stamp token to be stored in at least one of the first distributed ledger and the second distributed ledger.

According to the configuration, since the time stamp token is stored in at least one of the first distributed ledger and the second distributed ledger, tamper resistance of the tamper resistance can be enhanced.

(3) In one embodiment, the communication apparatus is further configured to communicate with an external server different from the data management apparatus. The controller causes the time stamp token to be stored in the storage device and transmits the time stamp token to the external server through the communication apparatus.

According to the configuration, the time stamp token is managed in the data management apparatus and also in the external server. In order to tamper the time stamp token, both of the time stamp token managed in the data management apparatus and the time stamp token managed in the external server should be tampered. By managing the time stamp token also in the external server, tamper resistance of the time stamp token can be higher than in an example where the time stamp token is managed only in the data management apparatus.

(4) In one embodiment, when the controller causes the record including the first information to be stored in the first distributed ledger and causes the record including the second information to be stored in the second distributed ledger in response to update of the first data and the second data, the controller generates the terminal value.

According to the configuration, a user of the data management apparatus can obtain the time stamp token for the terminal value by performing an operation to update the first data and the second data.

(5) In one embodiment, as a prescribed time period has elapsed since a time point when a time stamp token was previously obtained, the controller generates the terminal value.

According to the configuration, each time the prescribed time period elapses, the time stamp token for the terminal value can automatically be obtained.

(6) In one embodiment, the information on the record at the terminal in the first distributed ledger is a hash value of the record at the terminal in the first distributed ledger, and the information on the record at the terminal in the second distributed ledger is a hash value of the record at the terminal in the second distributed ledger.

According to the configuration, since the information on the record included in the terminal value is the hash value of the record, the record itself is not sent to the time stamp authority. Therefore, the record itself can be concealed at the time when the time stamp token is obtained.

(7) In one embodiment, the first information is a hash value of the first data and the second information is a hash value of the second data.

According to the configuration, the records stored in the first distributed ledger and the second distributed ledger include the hash value of the first data and the hash value of the second data, respectively. Since the first data and the second data are not stored in the first distributed ledger and the second distributed ledger, the first data and the second data themselves can be concealed from another data management apparatus that forms a distributed ledger network.

(8) A data management method according to another aspect of the present disclosure is a data management method by a data management apparatus that manages data based on a distributed ledger technology. The data management apparatus includes a storage device where a distributed ledger is stored, in the distributed ledger, a record including information on the data being stored in a time-series manner, a controller that adds the record to the distributed ledger, and a communication apparatus configured to communicate with a time stamp authority. The data includes first data and second data. The distributed ledger includes a first distributed ledger where a record including first information on the first data is stored in a time-series manner and a second distributed ledger where a record including second information on the second data is stored in a time-series manner. The data management method includes generating a terminal value including information on a record at a terminal in the first distributed ledger and information on a record at a terminal in the second distributed ledger and obtaining a time stamp token for the terminal value from the time stamp authority through the communication apparatus.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 2 is a diagram (No. 1) showing an exemplary configuration of a distributed ledger set.

FIG. 4 is a diagram (No. 2) showing an exemplary configuration of a distributed ledger set.

FIG. 12 is a diagram showing an exemplary configuration of a distributed ledger set according to the second embodiment.

FIG. 17 is a diagram showing an exemplary configuration of a ledger set.

FIG. 18 is a diagram for illustrating an exemplary configuration of a suspension table.

FIG. 19 is a diagram for illustrating an exemplary configuration of a commit table.

FIG. 20 is a flowchart showing a procedure in processing performed in the data management system at the time when an update request (a first request or a second request) is received.

DESCRIPTION OF THE PREFERRED EMBODIMENTS

Figure 1:
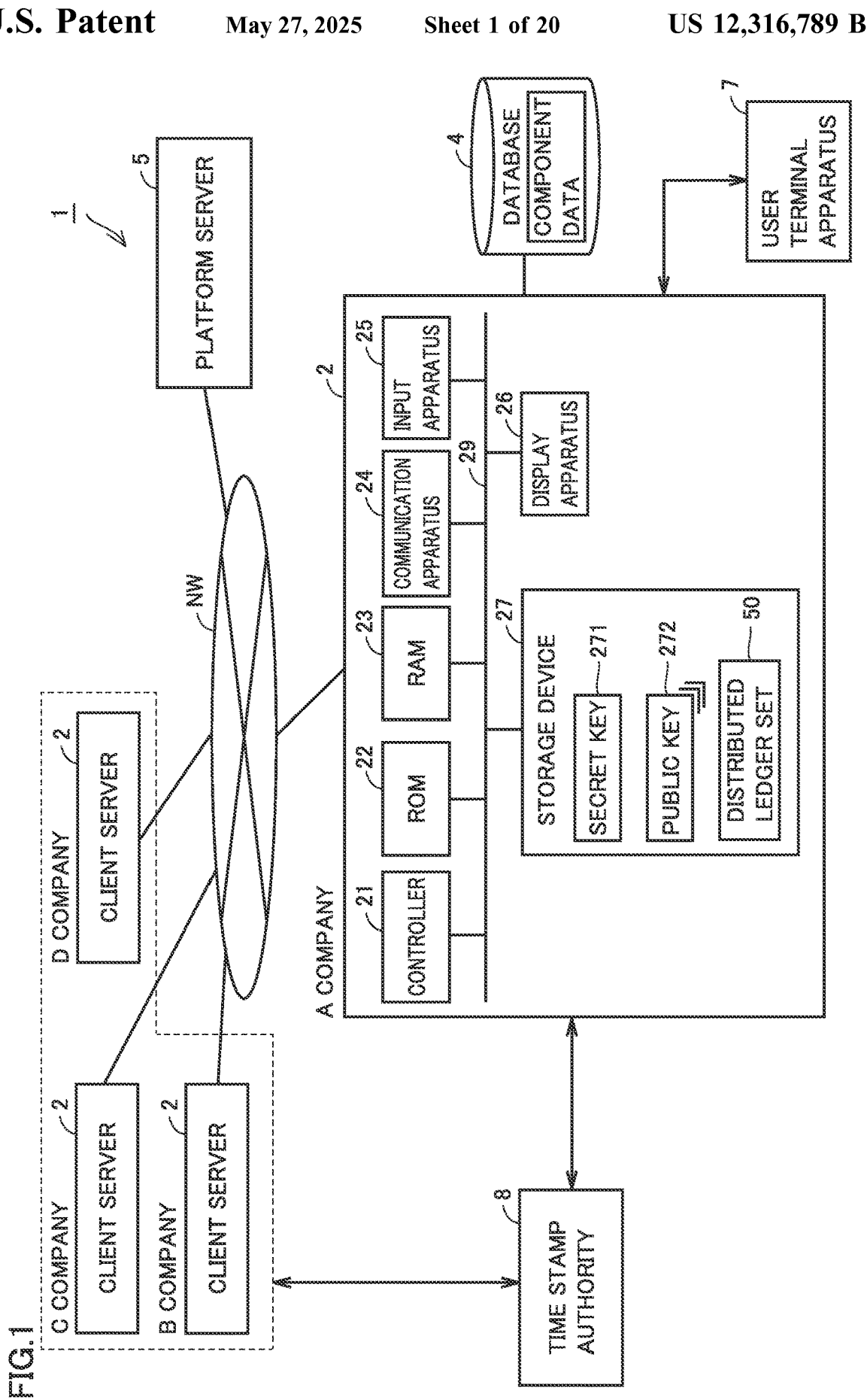
FIG. 1 is a diagram showing a schematic configuration of a data management system according to a first embodiment.

An embodiment of the present disclosure will be described in detail below with reference to the drawings. The same or corresponding elements in the drawings have the same reference characters allotted and description thereof will not be repeated.

First Embodiment

<Overall Configuration of Data Management System>

FIG. 1 is a diagram showing a schematic configuration of a data management system 1 according to a first embodiment. Data management system 1 according to the first embodiment is a system that forms a consortium network (which will also simply be referred to as a "network" below) NW among a plurality of companies and manages data based on a distributed ledger technology. Data management system 1 according to the first embodiment manages data on components (which will also simply be referred to as "component data" below) that compose a vehicle. The component data may be, for example, a specification of a component. Data managed by data management system 1 is not limited to data on components that compose a vehicle but various types of data may be applicable.

Referring to FIG. 1, data management system 1 includes four client servers 2, a platform server 5, and a time stamp authority (TSA) 8. Four client servers 2 belong to different companies (for example, an A company, a B company, a C company, and a D company).

Platform server 5 manages network NW. Platform server 5 accepts an application for participation in network NW from each client server 2. Platform server 5 permits participation of client server 2 into network NW based on an operation to permit participation performed by a manager of platform server 5 or based on a result of determination as to a prescribed condition. In the first embodiment, participation into network NW, of four client servers 2 belonging to the A company, the B company, the C company, and the D company, respectively, is permitted.

Four client servers 2 form network NW, and a hash value of component data is stored in a distributed ledger of each of them. Software based op the distributed ledger has been introduced in each of client servers 2, and as the introduced software based on the distributed ledger functions, each of client servers 2 functions as a node. Though client server 2 of the A company will representatively be described below, the client servers of the B company, the C company, and the D company are also similar in configuration and function. Client server 2 corresponds to an exemplary "data management apparatus" according to the present disclosure.

Client server 2 is configured to communicate with a user terminal apparatus 7. User terminal apparatus 7 is, for example, a desk-top personal computer (PC), a notebook PC, a tablet terminal, a smartphone, or another information processing terminal with a communication function lent to an employee of the A company.

A database 4 is connected to client server 2. Component data is stored in database 4. Component data is stored or updated in database 4 in accordance with a control signal from client server 2. For example, a user (for example, the employee of the A company) of client server 2 cart request update of component data by performing an operation onto an input apparatus 25 (which will be described later) of client server 2 or by performing an operation onto user terminal apparatus 7. Client server 2 (a controller 21) generates a control signal for storing/updating component data in response to an input to input apparatus 25 or a request from user terminal apparatus 7 and outputs the control signal to database 4.

As client server 2 has component data stored in database 4/updates component data in database 4, it generates a hash value of the component data and generates transaction data for storing the hash value in the distributed ledger. Then, client server 2 transmits the generated transaction data to another client server 2 that forms network NW, that is, client servers 2 of the B company, the C company, and the D company. In the distributed ledger, a hash value of the component data is stored in a time series manner, and the distributed ledger forms a proof chain for proving existence of the component data. Though an example where four client servers are included in network NW in data management system 1 according to the first embodiment is described, any number of client servers 2 such as less than four client servers or five or more client servers may be included in network NW.

Time stamp authority 8 includes a server belonging to an authentication organization that issues a time stamp token. The time stamp authority issues a time stamp token in response to a time stamp issuance request from an applicant (client server 2 in the first embodiment). More specifically, the time stamp authority transmits to the applicant, a time stamp token in which data (a terminal hash value which will be described later in the first embodiment) received from the applicant is linked to time information based on a time source with followability to international standard time.

Client server 2 includes controller 21, a read only memory (ROM) 22, a random access memory (RAM) 23, a communication apparatus 24, an input apparatus 25, a display apparatus 26, and storage device 27. Controller 21, ROM 22, RAM 23, communication apparatus 24, input apparatus 25, display apparatus 26, and storage device 27 are connected to a bus 29.

Controller 21 is implemented, for example, by an integrated circuit including a central processing unit (CPU). Controller 21 develops various programs stored in ROM 22 on RAM 23 and executes the programs. The various programs include an operating system and the like. RAM 23 functions as a working memory, and various types of data necessary for execution of various programs are temporarily stored therein. Though detailed description will be given later, controller 21 performs functions to update component data recorded in database 4, to generate transaction data for updating a distributed ledger, and to obtain a time stamp token.

Communication apparatus 24 is configured to communicate with external equipment. The external equipment includes, for example, another client server 2, user terminal apparatus 7, time stamp authority 8, and the like. Communication between communication apparatus 24 and the external equipment is established over the Internet, a wide area network (WAN), a local area network (LAN), an Ethernet® network, a public network, a private network, a wired network or a wireless network, or the like, combination thereof.

Input apparatus 25 includes an input device. The input device is implemented, for example, by a mouse, a keyboard, a touch panel, and/or another apparatus capable of accepting an operation by a user Display apparatus 26 includes a display. Display apparatus 26 has a display show various images in accordance with a control signal from controller 21. The display is implemented, for example, by a liquid crystal display, an organic electro luminescence (EL) display, or other display equipment.

Storage device 27 includes, for example, a storage medium such as a hard disk or a flash memory. A secret key 271, a plurality of public keys 272, and a distributed ledger set 50 are stored in storage device 27.

Secret key 271 is a secret key of the A company. For example, in participation of client server 2 into network NW for the first time, controller 21 generates a secret key and a public key. Then, controller 21 transmits the generated public key to art authentication bureau (not shown) to have the public key authenticated. The authentication bureau is an authentication organization that issues an electronic certificate. The authentication bureau issues an electronic certificate including information on the public key. Controller 21 has secret key 271 corresponding to the authenticated public key stored in storage device 27. Controller 21 transmits authenticated public key (electronic certificate) 272 to client servers 2 of the B company, the C company, and the D company.

The plurality of public keys 272 include the public key of the B company, the public key of the C company, and the public key of the D company. Controller 21 has the public keys received from other client servers 2 stored in storage device 27. The public key of the A company itself may be stored in storage device 27.

Distributed ledger set 50 includes a plurality of distributed ledgers. The distributed ledger is prepared for each component that composes the vehicle. FIG. 2 is a diagram showing an exemplary configuration of distributed ledger set 50. In the first embodiment, an example in which two components (a first component and a second component) that compose the vehicle are managed by data management system 1 will be described. Specifically, distributed ledger set 50 includes a distributed ledger 51 serving as a proof chain of component data of the first component, where a state of update of the component data of the first component is stored in a time-series manner, and a distributed ledger 52 serving as a proof chain of component data on the second component, where a state of update of the component data of the second component is stored in a time-series manner. When there are N (which is a natural number equal to or larger than two) components that compose the vehicle and the N components are managed in data management system 1, distributed ledger set 50 includes N distributed ledgers. A component the data of which is managed with the use of the distributed ledger will also be referred to as a "target component" below. In other words, the target component in the first embodiment is the first component and the second component.

A record including a hash value of the component data of the first component is stored in a time-series manner in distributed ledger 51. The record includes such information as "Key", "Age", "Obj-HV", "Nonce", "Sig", "Prev-HV", and "HV".

Key represents information indicating an ID of the target component (first component). An ID k1 is allocated to the first component.

Age represents information indicating a generation of a record. In the first record of the first component stored in distributed ledger 51, Age is set to Age 0. As the first component is updated and a record is added, Age is incremented.

Obj-HV represents a hash value of the component data of the first component. For example, as the component data of the first component registered in database 4 is updated, the hash value (for example, "OH2" in FIG. 2) of the updated component data is generated and defined as Obj-HV. The hash value is a numeric value obtained as a result of hashing of the component data with a hash function. Though details will be described later, a time stamp token (for example, "TM" in FIG. 4 which will be described later) may also be stored as Obj-HV.

Nonce represents a nonce value indicating a number of transaction data. Specifically, the nonce value is generated by client server 2 (controller 21), for example, at the time of update of the component data of the first component stored in database 4, as a number of processing for storing a hash value of the updated component data in distributed ledger 51. The nonce value refers to a hash value that is less likely to cryptographically cause collision.

Sig represents an electronic signature created with secret key 271 of client server 2 that has issued transaction data. The electronic signature is created, for example, by encryption of Obj-HV (that is, the hash value of the component data of the first component) with secret key 271. Alternatively, the electronic signature may be created, for example, by encryption of Nonce (nonce value) with secret key 271. Furthermore, the electronic signature may be created, for example, by encryption of Obj-HV and Nonce with secret key 271.

Prev-HV represents a hash value of a record (a parent record) in a generation immediately preceding the latest (terminal) record. In other words, Prev-HV represents HV of the parent record.

HV represents a hash value of the West (terminal) record. Specifically, HV represents a hash value (which will also be referred to as a "record hash value" below) of information (Key, Age, Obj-HV, Nonce, Sig, and Pre-HV) on a record except for HV.

For example, as shown in FIG. 2, with attention being paid to the latest (terminal) record (a record of Age "2") in distributed ledger 51, Pre-HV of the terminal record is set to "H2" which is HV of the parent record (Age "1"). Then, when the component data of the first component is updated and a record of Age "3" is added, Prev-HV of the record of Age "3" is set to "H3" which is HV of the record of Age "2". The terminal record thus has such a structure as including a record hash value of the parent record. In other words, a chain of records is realized between Prev-HV of the terminal record and HV of the parent record. Distributed ledger 51 is thus in a DAG structure.

A record including a hash value of the component data of the second component is stored in a time-series manner in distributed ledger 52. The record includes such information as "Key", "Age", "Obj-HV", "Nonce", "Sig", "Prev-HV", and "HV". Since details thereof are similar to those of the record in distributed ledger 51, description will not be repeated.

As client server 2 (controller 21) receives an operation to update the component data, for example, through input apparatus 25 or user terminal apparatus 7, it updates the component data stored in database 4. Then, client server 2 (controller 21) generates transaction data for adding the record including the hash value of the updated component data to distributed ledger set 50 (distributed ledger 51 or distributed ledger 52). This transaction data includes such information as "Key", "Age", "Obj-HV", "Nonce", "Sig", "Prev-HV", and "HV".

The transaction data may further include time information on time at which transaction data is broadcast toward network NW (transmitted to network NW) and sender information on a sender of the transaction data. The time information may be, for example, information indicating time at which component data of the target component is recorded in database 4. The sender information is, for example, information indicating the A company. The sender information of the transaction data may be further specific, and it may be information indicating a department (one department of the A company) that has performed an operation to transmit transaction data to network NW or information indicating an individual (an employee of the A company) who has performed the operation to transmit transaction data to network NW.

<Proof of Accuracy in Time>

Proof as to ordering that indicates which of the component data of the first component and the component data of the second component has existed earlier and accuracy in time that indicates time of existence of such data may be desired. A technique to prove ordering and accuracy in time may include, for example, proving time of addition of a record by obtaining, each time a record is added to each of distributed ledgers 51 and 52, a time stamp token for a record hash value of the added record (terminal record) and proving ordering and accuracy in time of two pieces of data. With this technique, however, the time stamp token should be obtained each time a record is added to distributed ledger 51 or 52, and man-hours and cost will increase. Processing load imposed on data management system 1 will also increase.

Then, in data management system 1 according to the first embodiment, a terminal hash value including a record hash value in distributed ledger 51 and a record hash value in distributed ledger 52 can be generated, and a time stamp token for the terminal hash value can be obtained. By obtaining the time stamp token for the terminal hash value, accuracy in time of component data of the first component and component data of the second component at the time point when the time stamp token is obtained can simultaneously be proven. Furthermore, in data management system 1 according to the first embodiment, the time stamp token can be incorporated into a record in at least one of distributed ledgers 51 and 52. As the time stamp token obtained for the terminal hash value is incorporated in the record in at least one of distributed ledgers 51 and 52, tamper resistance of the time stamp token can be enhanced Specific description will be given below with reference to FIG. 3. Processing for generating a terminal hash value and obtaining a time stamp token for the terminal hash value will also be referred to as "existence proof processing" below.

Figure 3:
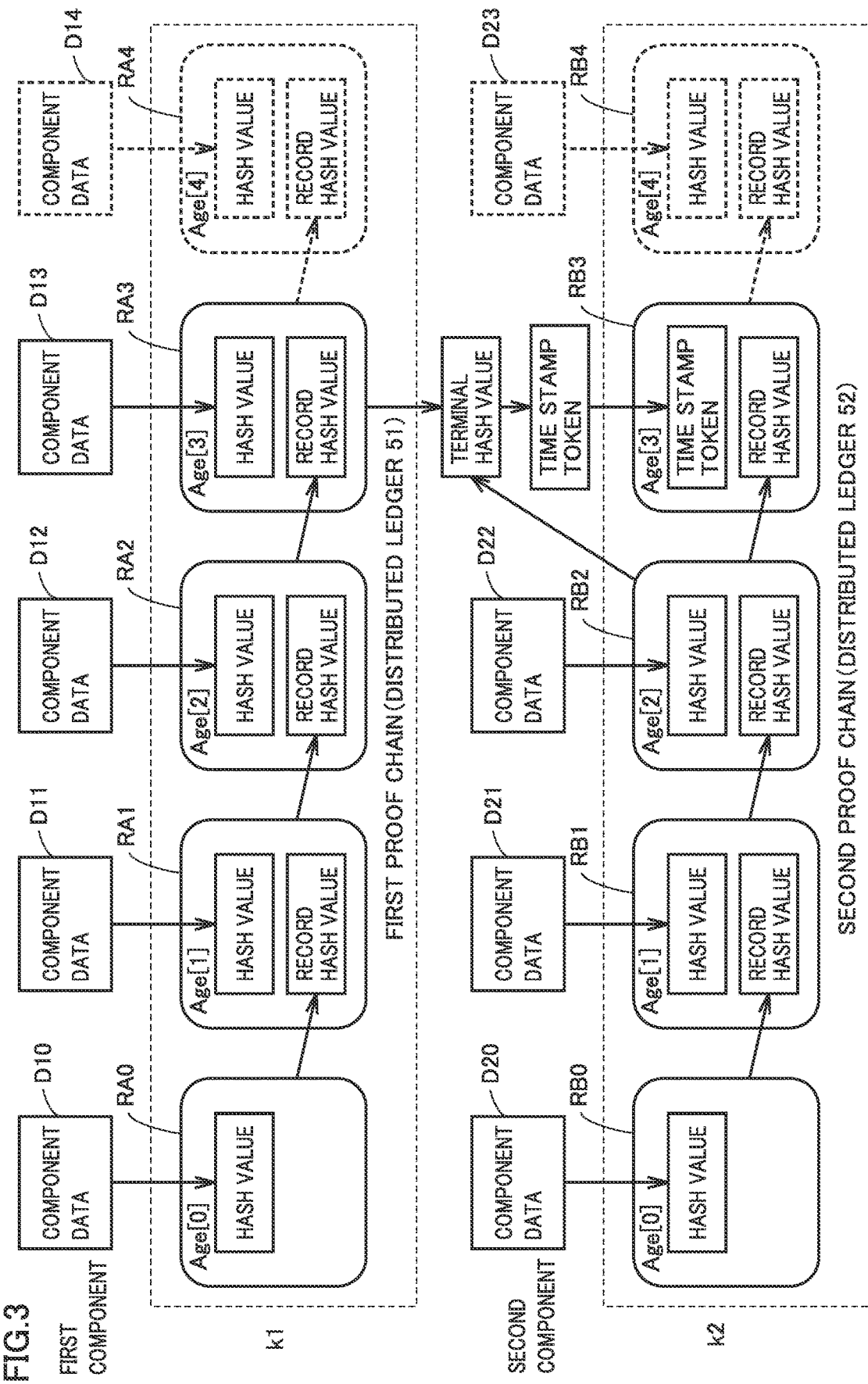
FIG. 3 is a diagram for illustrating existence proof processing.

FIG. 3 is a diagram for illustrating existence proof processing. An upper tier in FIG. 3 schematically shows distributed ledger 51 which is the proof chain of the first component and a lower tier in FIG. 3 schematically shows distributed ledger 52 which is the proof chain of the second component. The proof chain of the first component will also be referred to as a "first proof chain" below and the proof chain of the second component will also be referred to as a "second proof chain" below.

In the description below, an operation to update only one of the component data of the first component and the component data of the second component will also be referred to as a "first operation." An operation to simultaneously update the component data of the first component and the component data of the second component will also be referred to as a "second operation."

A record including a hash value of the component data of the first component is stored in a time-series manner in the first proof chain (distributed ledger 51). As the first operation is performed and component data D10 of the first component is first registered in database 4, a record RA0 of Age "0" including a hash value of that component data D10 is stored in distributed ledger 51. Then, as the first operation is performed to update the component data of the first component and updated component data D11 is registered in database 4, a record RA1 of Age "1" including a hash value of updated component data D11 and a record hash value of a parent record RA0 of Age "0" is stored in distributed ledger 51. Furthermore, as the first operation is performed to update the component data of the first component and updated component data D12 is registered in database 4, a record RA2 of Age "2" including a hash value of updated component data D12 and a record hash value of a parent record RA1 of Age "1" is stored in distributed ledger 51.

A record including a hash value of the component data of the second component is stored in a time-series manner in the second proof chain (distributed ledger 52). As the first operation is performed and component data D20 of the second component is first registered in database 4, a record RB0 of Age "0" including a hash value of that component data D20 is stored in distributed ledger 52. Then, as the first operation is perforated to update the component data of the second component and updated component data D21 is registered in database 4, a record RB1 of Age "1" including a hash value of updated component data D21 and a record hash value of a parent record RB0 of Age "0" is stored in distributed ledger 52.

It is assumed here that record RA2 of Age "2" is the latest (terminal) record in distributed ledger 51 and record RB1 of Age "1" is the latest (terminal) record in distributed ledger 52. Then, it is assumed that the second operation to simultaneously update the component data of the first component and the component data of the second component is performed on input apparatus 25 or user terminal apparatus 7 in this state. In the first embodiment, when the second operation is performed, existence proof processing is performed. In other words, the second operation serves as a condition for performing existence proof processing.

The second operation may be, for example, an operation to input IDs (Keys) of two target components and to select a shown update button on a display screen of display apparatus 26 or user terminal apparatus 7. Furthermore, in the display screen for performing the second operation, for example, a "target input field" for input of an ID (Key) of a target component into which an obtained time stamp token is to be incorporated is provided. For example, when k1 is inputted into the target input field, the time stamp token obtained by existence proof processing is incorporated into a record in the first proof chain (distributed ledger 51). For example, when k2 is inputted into the target input field, the time stamp token obtained by existence proof processing is incorporated into a record in the second proof chain (distributed ledger 52). For example, when k1 and k2 are inputted into target input fields, the time stamp token obtained in existence proof processing is incorporated into the record in the first proof chain (distributed ledger 51) and the record in the second proof chain (distributed ledger 52). It is assumed that k2 is inputted into the target input field in the example shown in FIG. 3.

Referring to FIGS. 2 and 3, when the second operation to simultaneously update the component data of the first component and the component data of the second component is performed, controller 21 initially updates component data D12 of the first component stored in database 4 to component data D13 and updates component data D21 of the second component to component data D22. When component data D10 of the first component is first stored in database 4, controller 21 should only have the component data of the first component newly stored in database 4. Similarly, when component data D20 of the second component is first stored in database 4, controller 21 should only have the component data of the second component newly stored in database 4.

Then, controller 21 creates a record RA3 of Age "3" including a hash value of component data D13 and a record hash value of parent record RA2 and has record RA3 stored in distributed ledger 51. Controller 21 generates transaction data (which is also referred to as "transaction data A" below) for adding record RA3 to distributed ledger 51. Controller 21 creates a record RB2 of Age "2" including a hash value of component data D22 and a record hash value of parent record RB1 and has record RB2 stored in distributed ledger 52. Controller 21 generates transaction data (which is also referred to as "transaction data B" below) for adding record RB2 to distributed ledger 52. Controller 21 transmits generated transaction data A and B to client servers 2 of the B company, the C company, and the D company through communication apparatus 24. As transaction processing for executing transaction data A is performed in client server 2 of each of the B company, the C company, and the D Company, record RA3 is stored in distributed ledger 51 of each client server 2. As transaction processing for executing transaction data B is performed in client server 2 of each of the B company, the C company, and the D company, record RB2 is stored in distributed ledger 52 of each client server 2. Transaction data A and B may be generated as a single piece of transaction data.

As records RA3 and RB2 are stored in respective distributed ledgers 51 and 52, controller 21 generates a record hash value of record RA3 and a record hash value of record RB2. Then, controller 21 generates a terminal hash value including the record hash value of record RA3 and the record hash value of record RB2. Controller 21 transmits the terminal hash value to time stamp authority 8 through communication apparatus 24 and obtains a time stamp token for the terminal hash value from time stamp authority 8.

Then, controller 21 creates a record RB3 including the time stamp token and the record hash value of record RB2 (patent record) in distributed ledger 52 and has record RB3 stored in distributed ledger 52. Controller 21 generates transaction data for adding record RB3 to distributed ledger 52. Controller 21 transmits the generated transaction data to client servers 2 of the B company, the C company, and the D company through communication apparatus 24. As transaction processing for executing the transaction data is performed in client server 2 of each of the B company, the C company, and the D company, record RB3 is stored in distributed ledger 52 of each client server 2.

An exemplary specific structure of distributed ledger 52 corresponding to FIG. 3 is as shown in FIG. 4. FIG. 4 is a diagram showing an exemplary configuration of distributed ledger set 50. In response to the second operation to simultaneously update component data D12 to component data D13 and update component data D21 to component data D22, record RA3 of Age "3" is added to distributed ledger 51 and record RB2 of Age "2" is added to distributed ledger 52. Then, record RB3 of Age "3" where the time stamp token obtained for the terminal hash value is stored is added to distributed ledger 52. Record RB3 of Age "3" in distributed ledger 52 includes time stamp token TM as Obj-HV.

As set forth above, as the operation (second operation) to simultaneously update the component data of the first component and the component data of the second component, specifically, the operation to simultaneously update component data D12 to component data D13 and update component data D21 to component data D22, is performed, controller 21 adds record RA3 including the hash value of component data D13 to distributed ledger 51 and adds record RB2 including the hash value of component data D22 to distributed ledger 52. Then, controller 21 generates the terminal hash value including the record hash value of record RA3 and the record hash value of record RB2. Controller 21 transmits the terminal hash value to time stamp authority 8 and obtains the time stamp token for the terminal hash value. By obtaining the time stamp token for the terminal hash value including the record hash value of record RA3 and the record hash value of record RB2, existence of component data D10 to D13 of the first component and existence of component data D20 to D22 of the second component at the time proven by the time stamp token can be proven. As shown in FIG. 3, component data D13 is updated to component data D14 and component data D22 is updated to component data D23 at a time point after the time point when the time stamp token was obtained. By obtaining the time stamp token for the terminal hash value as above, registration of component data D14 and component data D23 after the time point when the time stamp token was obtained can be proven. Man-hours, cost, and load imposed on the system can be less than in an example where the time stamp token is obtained for each of records RA3 and RB2 in respective distributed ledgers 51 and 52.

By incorporating the time stamp token in the record in distributed ledger 52, tamper resistance of the time stamp token can be enhanced. The time stamp token may be incorporated in the record in distributed ledger 51, or in the record in distributed ledger 51 and the record in distributed ledger 52.

When component data of the first component is further updated front D13 to D14, a record RA4 of Age "4" including a hash value of component data D14 and a record hash value of record RA3 is added to distributed ledger 51. Similarly, when component data of the second component is further updated front D22 to D23, a record RB4 of Age "4" including a hash value of component data D23 and a record hash value of record RB3 is added to distributed ledger 52.

<Functional Block>

Figure 5:
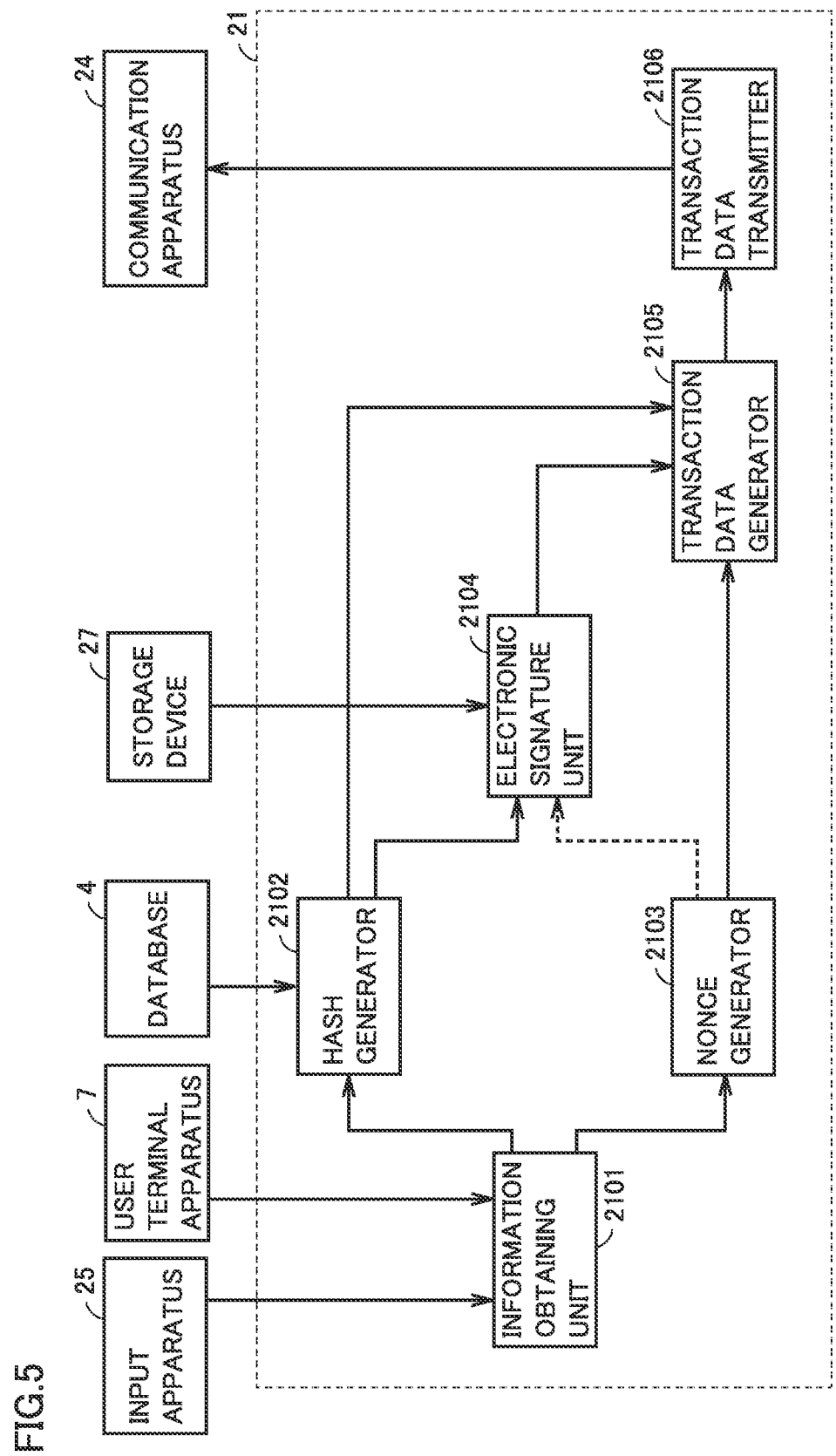
FIG. 5 is a functional block diagram of a controller for performing processing for responding to a first operation.

FIG. 5 is a functional block diagram of controller 21 for performing processing for responding to the first operation. Referring to FIG. 5, controller 21 includes an information obtaining unit 2101, a hash generator 2102, a nonce generator 2103, an electronic signature unit 2104, a transaction data generator 2105, and a transaction data transmitter 2106. Controller 21 functions as information obtaining unit 2101, hash generator 2102, nonce generator 2103, electronic signature unit 2104, transaction data generator 2105, and transaction data transmitter 2106, for example, by executing a program stored in ROM 22. Information obtaining unit 2101, hash generator 2102, nonce generator 2103, electronic signature unit 2104, transaction data generator 2105, and transaction data transmitter 2106 may be implemented, for example, by dedicated hardware (electronic circuitry).

As the first operation to update the component data of the target component (the first component or the second component) is performed on input apparatus 25 or user terminal apparatus 7, input apparatus 25 or user terminal apparatus 7 outputs a first request indicating that the first operation has been performed.

Information Obtaining unit 2101 obtains the first request from input apparatus 25 or user terminal apparatus 7. For example, when a user of client server 2 operates input apparatus 25 to have the component data of the target component stored (registered/updated) in database 4, the first request is inputted to information obtaining unit 2101. The first request includes an ID (Key) for identifying a target component. As information obtaining unit 2101 obtains the first request, it outputs the first request to hash generator 2102 and nonce generator 2103.

As hash generator 2102 receives the first request, for example, it reads the component data of the target component from database 4 and generates the hash value of the read component data. Hash generator 2102 outputs the generated hash value and the ID of the target component to electronic signature unit 2104 and transaction data generator 2105.

As nonce generator 2103 receives the first request, it generates a nonce value. The nonce value refers to a hash value that is less likely to cryptographically cause collision. Nonce generator 2103 outputs the generated nonce value and the ID of the target component to transaction data generator 2105. When the nonce value is used for creation of the electronic signature, nonce generator 2103 may output the nonce value and the ID of the target component to electronic signature unit 2104.

Electronic signature unit 2104 reads secret key 271 from storage device 27. Electronic signature unit 2104 creates the electronic signature by encrypting with secret key 271, the hash value received from hash generator 2102. Electronic signature unit 2104 outputs the created electronic signature and the ID of the target component to transaction data generator 2105. Alternatively, electronic signature unit 2104 may create the electronic signature by encrypting with secret key 271, the nonce value received from nonce generator 2103. Alternatively, electronic signature unit 2104 may create the electronic signature by encrypting the hash value and the nonce value with secret key 271.

Transaction data generator 2105 generates transaction data to be transmitted to network NW. For example, transaction data generator 2105 generates transaction data including such information as Key, Age, Obj-HV, Nonce, Sig, Prev-HV, and HV. Transaction data generator 2105 recognizes Age of the parent record, for example, by checking Key against distributed ledger set 50, increments Age of the parent record, and sets incremented Age as Age of the record to be added. Transaction data generator 2105 sets the hash value generated by hash generator 2102 as Obj-HV, sets the nonce value generated by nonce generator 2103 as Nonce, and sets the electronic signature created by electronic signature unit 2104 as Sig. Transaction data generator 2105 sets the record hash value of the parent record as Prev-HV. Transaction data generator 2105 hashes such information as Key, Age, Obj-HV, Nonce, Sig, and Prev-HV, and sets the information as HV. The transaction data may further include time information on time at which the transaction data is broadcast toward network NW (transmitted to network NW) and sender information on a sender of the transaction data.

Transaction data generator 2105 outputs the generated transaction data to transaction data transmitter 2106.

Transaction data transmitter 2106 outputs to communication apparatus 24, a control signal for transmitting transaction data to network NW. The transaction data is thus transmitted to network NW through communication apparatus 24.

Figure 6:
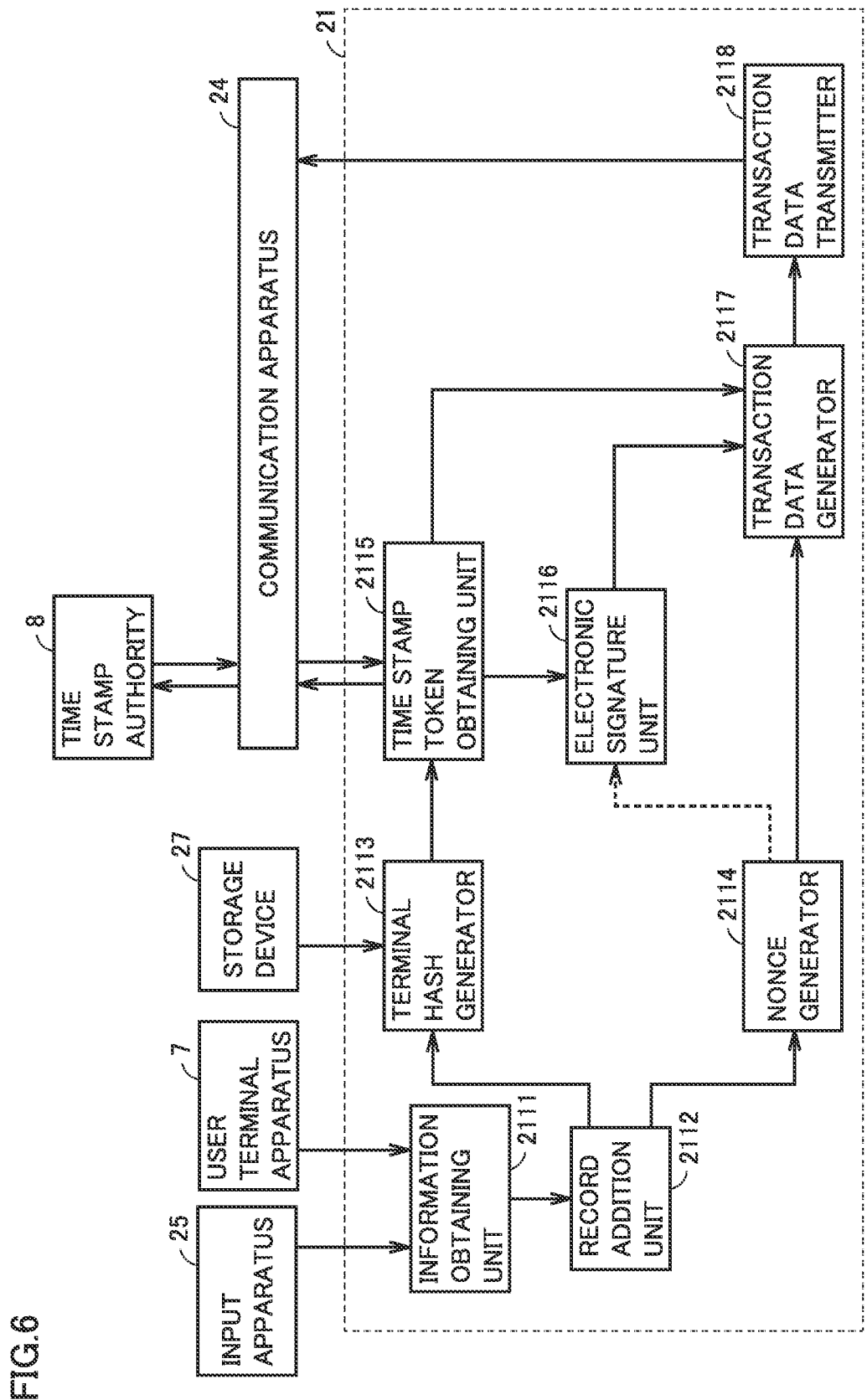
FIG. 6 is a functional block diagram of the controller for performing processing for responding to a second operation.

FIG. 6 is a functional block diagram of controller 21 for performing processing for responding to the second operation. Referring to FIG. 6, controller 21 includes an information obtaining unit 2111, a record addition unit 2112, a terminal hash generator 2113, a nonce generator 2114, a time stamp token obtaining unit 2115, an electronic signature unit 2116, a transaction data generator 2117, and a transaction data transmitter 2118. Controller 21 functions as information obtaining unit 2111, record addition unit 2112, terminal hash generator 2113, nonce generator 2114, time stamp token obtaining unit 2115, electronic signature unit 2116, transaction data generator 2117, and transaction data transmitter 2118, for example, by executing a program stored in ROM 22. Information obtaining unit 2111, record addition unit 2112, terminal hash generator 2113, nonce generator 2114, time stamp token obtaining unit 2115, electronic signature unit 2116, transaction data generator 2117, and transaction data transmitter 2118 may be implemented, for example, by dedicated hardware (electronic circuitry).

As the second operation to simultaneously update the component data of the first component and the component data of the second component is performed on input apparatus 25 or user terminal apparatus 7, input apparatus 25 or user terminal apparatus 7 outputs a second request indicating that the second operation has been performed.

Information obtaining unit 2111 obtains the second request from input apparatus 25 or user terminal apparatus 7. For example, as the user of client server 2 operates input apparatus 25 to have the component data of the first component and the second component stored (registered/updated) in database 4, the second request is inputted to information obtaining unit 2111. The second request includes IDs (k1 and k2) for identifying target components and an ID (for example, k2) inputted into the target input field, of a target component into which the time stamp token is to be incorporated. As information obtaining unit 2111 obtains the second request, it outputs the second request to record addition unit 2112.

Record addition unit 2112 performs a function similar to the function described with reference to FIG. 5. Specifically, record addition unit 2112 performs processing similar to the processing shown in FIG. 5 onto target components specified by the IDs to generate transaction data A for adding the record (for example, record RA3 in FIG. 3) including the hash value of the component data of the first component to distributed ledger 51 and transaction data B for adding the record (for example, record RB2 in FIG. 3) including the hash value of the component data of the second component to distributed ledger 52 and to transmit the transaction data to network NW. As record addition unit 2112 completes transmission of transaction data A and B to network NW, it outputs the second request to terminal hash generator 2113 and nonce generator 2114.

Terminal hash generator 2113 generates a terminal hash value including the record hash value of the latest (terminal) record (for example, record RA3 in FIG. 3) in distributed ledger 51 and the record hash value of the latest (terminal) record (for example, record RB2 in FIG. 3) in distributed ledger 52. Terminal hash generator 2113 outputs to time-stamp token obtaining unit 2115, the generated terminal hash value and the ID (for example, k2) of the target component into which the time stamp token is to be incorporated.

As nonce generator 2114 receives the second request, it generates the nonce value. Nonce generator 2114 outputs to transaction data generator 2117, the generated nonce value and the ID (for example, k2) of the target component into which the time stamp token is to be incorporated. When the nonce value is used for creation of the electronic signature, nonce generator 2114 may output the nonce value and the ID (for example, k2) of the target component into which the time stamp token is to be incorporated to electronic signature unit 2116.

Time stamp token obtaining unit 2115 obtains the time stamp token for the terminal hash value received from terminal hash generator 2113. Specifically, time stamp token obtaining unit 2115 outputs to communication apparatus 24, a control signal for transmitting the terminal hash value to time stamp authority 8. The terminal hash value is thus transmitted to time stamp authority 8 through communication apparatus 24. Time stamp authority 8 that has received the terminal hash value sends the time stamp token back to client server 2 which is the sender of the terminal hash value. Time stamp token obtaining unit 2115 obtains the time stamp token from time stamp authority 8 through communication apparatus 24. Time stamp token obtaining unit 2115 outputs the time stamp token and the ID (for example, k2) into which the time stamp token is to be incorporated to electronic signature unit 2116 and transaction data generator 2117.

Electronic signature unit 2116 reads secret key 271 from storage device 27. Electronic signature unit 2116 creates the electronic signature by encrypting the time stamp token received from time stamp token obtaining unit 2115 with secret key 271. Electronic signature unit 2116 outputs to transaction data generator 2117, the created electronic signature and the ID (for example, k2) of the target component into which the time stamp token into be incorporated. Alternatively, electronic signature unit 2116 may create the electronic signature by encrypting the nonce value received from nonce generator 2114 with secret key 271. Alternatively, electronic signature unit 2116 may create the electronic signature by encrypting the time stamp token and the nonce value with secret key 271.

Transaction data generator 2117 generates transaction data (which will also be referred to as "transaction data C" below) to be transmitted to network NW. For example, transaction data generator 2117 generates transaction data including such information as Key, Age, Obj-HV, Nonce, Sig, Prev-HV, and HV. Transaction data generator 2117 sets the ID (for example, k2) of the target component into which the time stamp token is to be incorporated as Key. Transaction data generator 2117 sets the time stamp token as Obj-HV. Other functions of transaction data generator 2117 are basically similar to those of transaction data generator 2105 described with reference to FIG. 5.

Transaction data transmitter 2118 outputs to communication apparatus 24, a control signal for transmitting transaction data C to network NW. Transaction data C is thus transmitted to network NW through communication apparatus 24.

Figure 7:
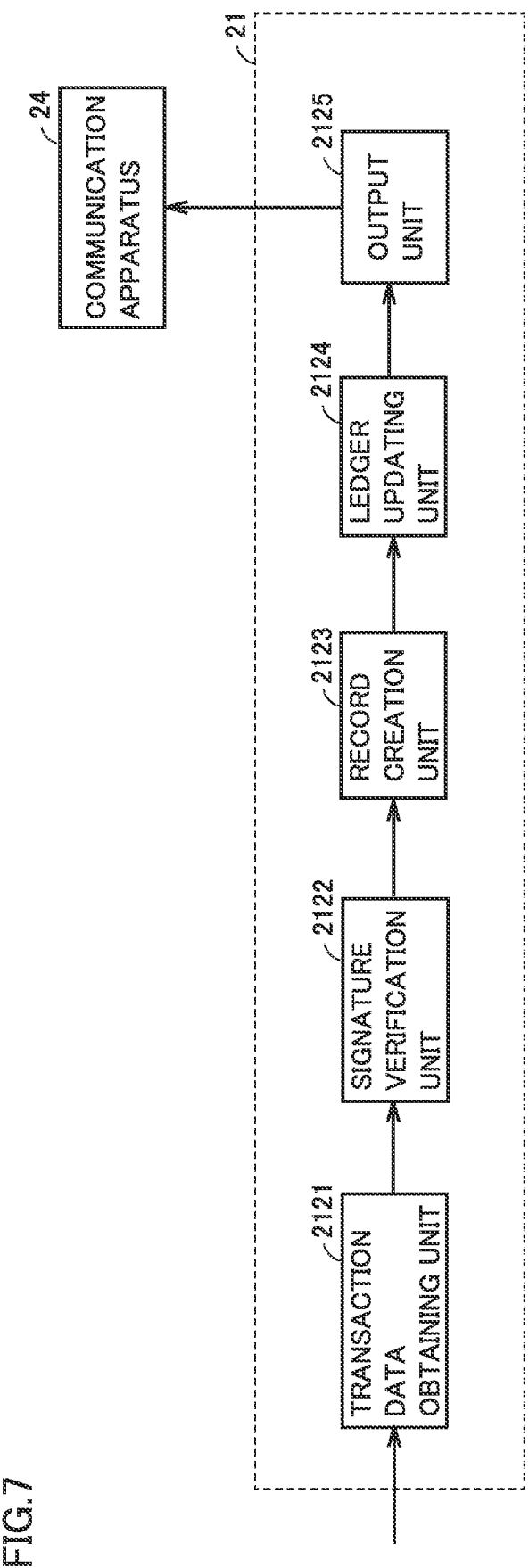
FIG. 7 is a functional block diagram of the controller for executing received transaction data.

FIG. 7 is a functional block diagram of controller 21 for executing received transaction data. Referring to FIG. 7, controller 21 includes a transaction data obtaining unit 2121, a signature verification unit 2122, a record creation unit 2123, a ledger updating unit 2124, and an output unit 2125. Controller 21 functions as transaction data obtaining unit 2121, signature verification unit 2122, record creation unit 2123, ledger updating unit 2124, and output unit 2125, for example, by executing a program stored in ROM 22. Transaction data obtaining unit 2121, signature verification unit 2122, record creation unit 2123, ledger updating unit 2124, and output unit 2125 may be implemented, for example, by dedicated hardware (electronic circuitry).

Transaction data obtaining unit 2121 obtains transaction data transmitted from another client server 2. Transaction data obtaining unit 2121 outputs the obtained transaction data to signature verification unit 2122.

Signature verification unit 2122 verifies validity of the electronic signature (Sig) included in the transaction data. Initially, signature verification unit 2122 identifies client server 2 which is the sender of the transaction data based on sender information included in the transaction data. Then, signature verification unit 2122 reads a public key (one of a plurality of public keys 272) of identified client server 2 from storage device 27. Signature verification unit 2122 decrypts the electronic signature included in the transaction data with the read public key. As described above, the electronic signature is created by encryption of the hash value of the component data or the time stamp token with the secret key of sender client server 2. Signature verification unit 2122 compares the decrypted value with Obj-HV (the hash value or the time stamp token) included in the transaction data. When signature verification unit 2122 confirms match therebetween, it acknowledges validity of the electronic signature.

When validity of the electronic signature is acknowledged, record creation unit 2123 creates a record to be added to distributed ledger set 50 based on the transaction data. Record creation unit 2123 reads such information as Key, Age, Obj-HV, Nonce, Sig, Prev-HV, and HV from the transaction data and creates a record including such information.

Ledger updating unit 2124 adds the record created by record creation unit 2123 to distributed ledger set 50 to update distributed ledger set 50. Specifically, ledger updating unit 2124 refers to Key in the created record and identifies a distributed ledger to which the record is to be added. For example, transaction data generated in accordance with the first operation to update the component data of the first component includes as Key, "k1" indicating the ID of the first component. The record created based on this transaction data also includes "k1" as Key. Therefore, ledger updating unit 2124 adds the record to distributed ledger 51 which is the proof chain of the component data of the first component.

Above-described transaction data A generated in accordance with the second operation includes as Key, "k1" indicating the ID of the first component. The record created based on transaction data A also includes "k1" as Key. Therefore, ledger updating unit 2124 adds the record to distributed ledger 51 which is the proof chain of the component data of the first component. Above-described transaction data B generated in accordance with the second operation includes as Key, "k2" indicating the ID of the second component. The record created based on transaction data B also includes "k2" as Key. Therefore, ledger updating unit 2124 adds the record to distributed ledger 52 which is the proof chain of the component data of the second component. In the example described above, above-described transaction data C generated in accordance with the second operation includes as Key, "k2" indicating the ID of the second component. A record created based on transaction data C also includes "k2" as Key. Therefore, ledger updating unit 2124 adds the record to distributed ledger 52 which is the proof chain of the component data of the second component. The record including the time stamp token is thus stored in distributed ledger 52.

As update of distributed ledger set 50 is completed, ledger updating unit 2124 outputs that fact to output unit 2125.

Output unit 2125 outputs to communication apparatus 24, a control signal for transmission of an indication of completion of processing for executing transaction data (transaction processing) to client server 2 which is the sender of the transaction data. A report on completion of transaction processing is thus transmitted through communication apparatus 24 to client server 2 which is the sender of the transaction data.

<Flowchart>

Figure 8:
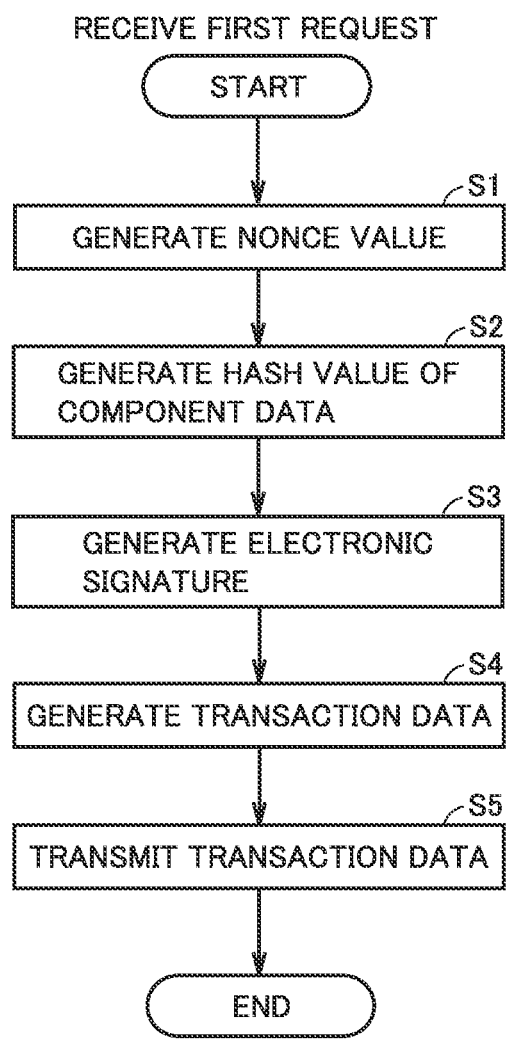
FIG. 8 is a flowchart showing a procedure in processing for generating transaction data at the time when a first request is received.

FIG. 8 is a flowchart showing a procedure in processing for generating transaction data at the time when the first request is received. Processing in the flowchart shown in FIG. 8 is performed by controller 21 when it receives the first request from input apparatus 25 or user terminal apparatus 7. Though an example in which each step (the step being abbreviated as "S" below) in the flowchart shown in FIG. 8 and FIGS. 9 and 10 which will be described later is performed by software processing by controller 21 is described, a part or the entirety thereof may be performed by hardware (electronic circuitry) provided in controller 21.

In S1, controller 21 generates a nonce value. The nonce value is used as a number of transaction data.

In S2, controller 21 reads component data of a target component from database 4 based on the ID for identifying the target component included in the first request and generates a hash value of the component data.

In S3, controller 21 reads secret key 271 from storage device 27 and creates an electronic signature by encrypting with secret key 271, the hash value generated in S2. Controller 21 may create the electronic signature by encrypting with secret key 271, the nonce value generated in S1. Alternatively, controller 21 may create the electronic signature by encrypting with secret key 271, the hash value generated in S2 and the nonce value generated in S1.

In S4, controller 21 generates transaction data including such information as Key, Age, Obj-HV, Nonce, Sig, Prev-HV, and HV. Specifically, controller 21 sets the ID of the target component included in the first request as Key. Controller 21 sets the nonce value generated in S1 as Nonce, sets the hash value generated in S2 as Obj-HV, and sets the electronic signature created in S3 as Sig. Controller 21 recognizes Age of the parent record by checking Key against distributed ledger set 50 and sets incremented Age of the parent record as Age. Controller 21 sets the record hash (HV) of the parent record as Prev-HV. Controller 21 hashes such information as Key, Age, Obj-HV, Nonce, Sig, and Prev-HV except for HV information and sets the information as HV. Controller 21 may have time information on time at which the transaction data is broadcast toward network NW and sender information on the sender of the transaction data included in the transaction data.

In S5, controller 21 outputs to communication apparatus 24, a control signal for transmitting the transaction data generated in S4 to network NW. The transaction data is thus transmitted to network NW through communication apparatus 24.

Figure 9:
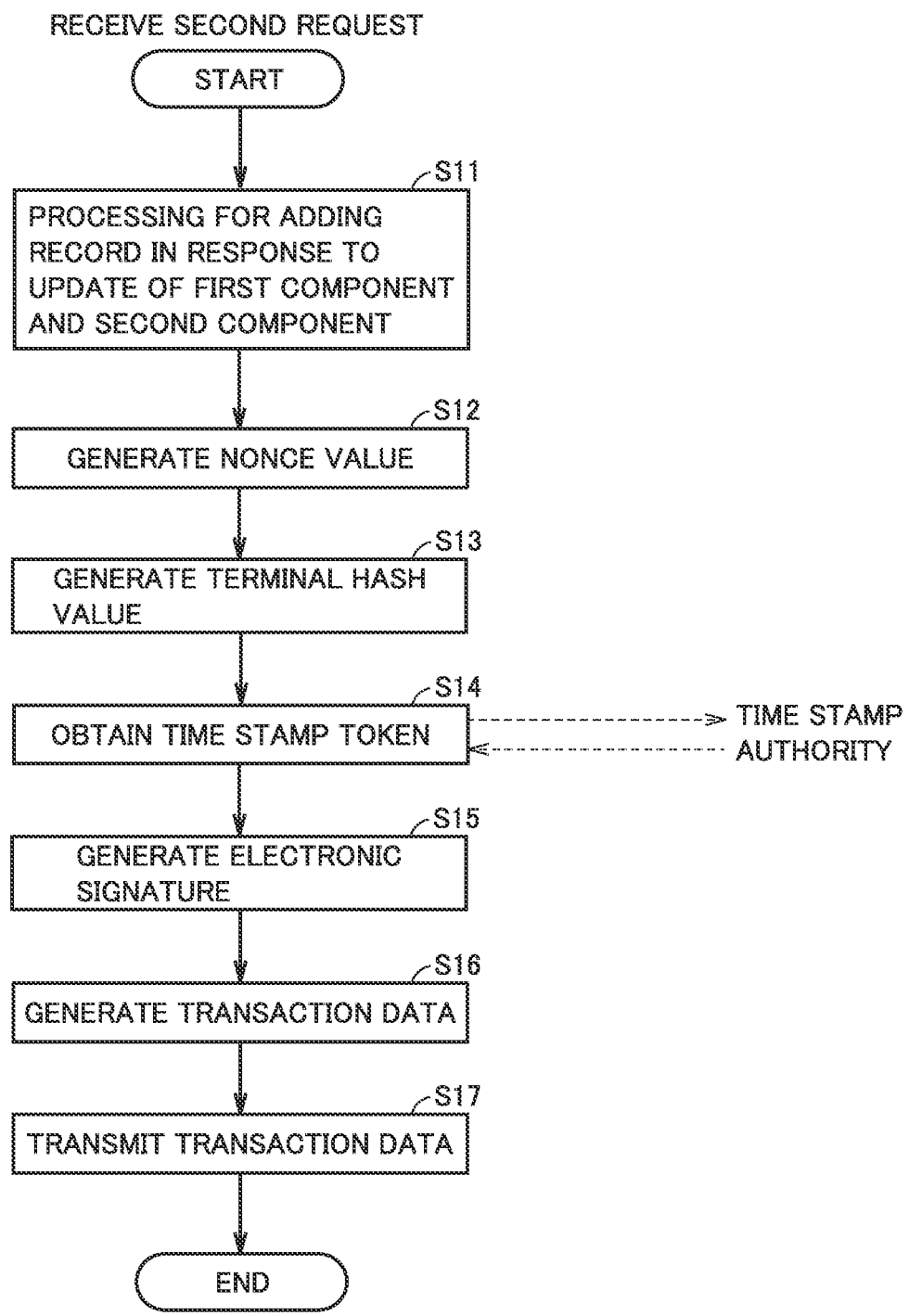
FIG. 9 is a flowchart showing a procedure in processing for generating transaction data at the time when a second request is received.

FIG. 9 is a flowchart showing a procedure in processing for generating transaction data at the time when the second request is received. Processing in the flowchart shown in FIG. 9 is performed by controller 21 when it receives the second request from input apparatus 25 or user terminal apparatus 7.

In S11, controller 21 performs processing for transmitting transaction data for adding records in response to update of the component data of the first component and the component data of the second component to respective distributed ledgers 51 and 52. Specifically, controller 21 performs processing similar to the processing described with reference to FIG. 8 to generate transaction data A for adding the record in response to update of the component data of the first component to distributed ledger 51 and to output to communication apparatus 24, a control signal for transmitting transaction data A to network NW. In addition, controller 21 performs processing similar to the processing described with reference to FIG. 8 to generate transaction data B for adding the record in response to update of the component data of the second component to distributed ledger 52 and to output to communication apparatus 24, a control signal for transmitting transaction data B to network NW.

In S12, controller 21 generates a nonce value. The nonce value is used as a number of transaction data to be generated in S16 which will be described later.

In S13, controller 21 creates a terminal hash value including the record hash value of the terminal record (that is, the record added to distributed ledger 51 by execution of transaction data. A transmitted in S11) in distributed ledger 51 and the record hash value of the terminal record (that is, the record added to distributed ledger 52 by execution of transaction data B transmitted in S11) in distributed ledger 52.

In S14, controller 21 outputs to communication apparatus 24, a control signal for transmitting the terminal hash value generated in S13 to time stamp authority 8. The terminal hash value is thus transmitted to time stamp authority 8 through communication apparatus 24. Time stamp authority 8 that has received the terminal hash value sends a time stamp token back to client server 2 which is the sender of the terminal hash value. Controller 21 obtains the time stamp taken from time stamp authority 8 through communication apparatus 24.

In S15, controller 21 reads secret key 271 from storage device 27 and creates the electronic signature by encrypting with secret key 271, the time stamp token obtained in S14. Controller 21 may create the electronic signature by encrypting with secret key 271, the nonce value generated in S12. Alternatively, controller 21 may create the electronic signature by encrypting with secret key 271, the time stamp token obtained in S14 and the nonce value generated in S12.

In S16, controller 21 generates transaction data including such information as Key, Age, Obj-HV, Nonce, Sig, Prev-HV, and HV. Controller 21 sets the (k2 in the example described above) inputted into the "target input field" as Key. Controller 21 sets the time stamp token obtained in S14 as Obj-HV. Since other processing in S16 is basically similar to the processing in S4 in FIG. 8, description will not be repeated.

In S17, controller 21 outputs to communication apparatus 24, a control signal for transmitting the transaction data generated in S16 to network NW. The transaction data is thus transmitted to network NW through communication apparatus 24.

Figure 10:
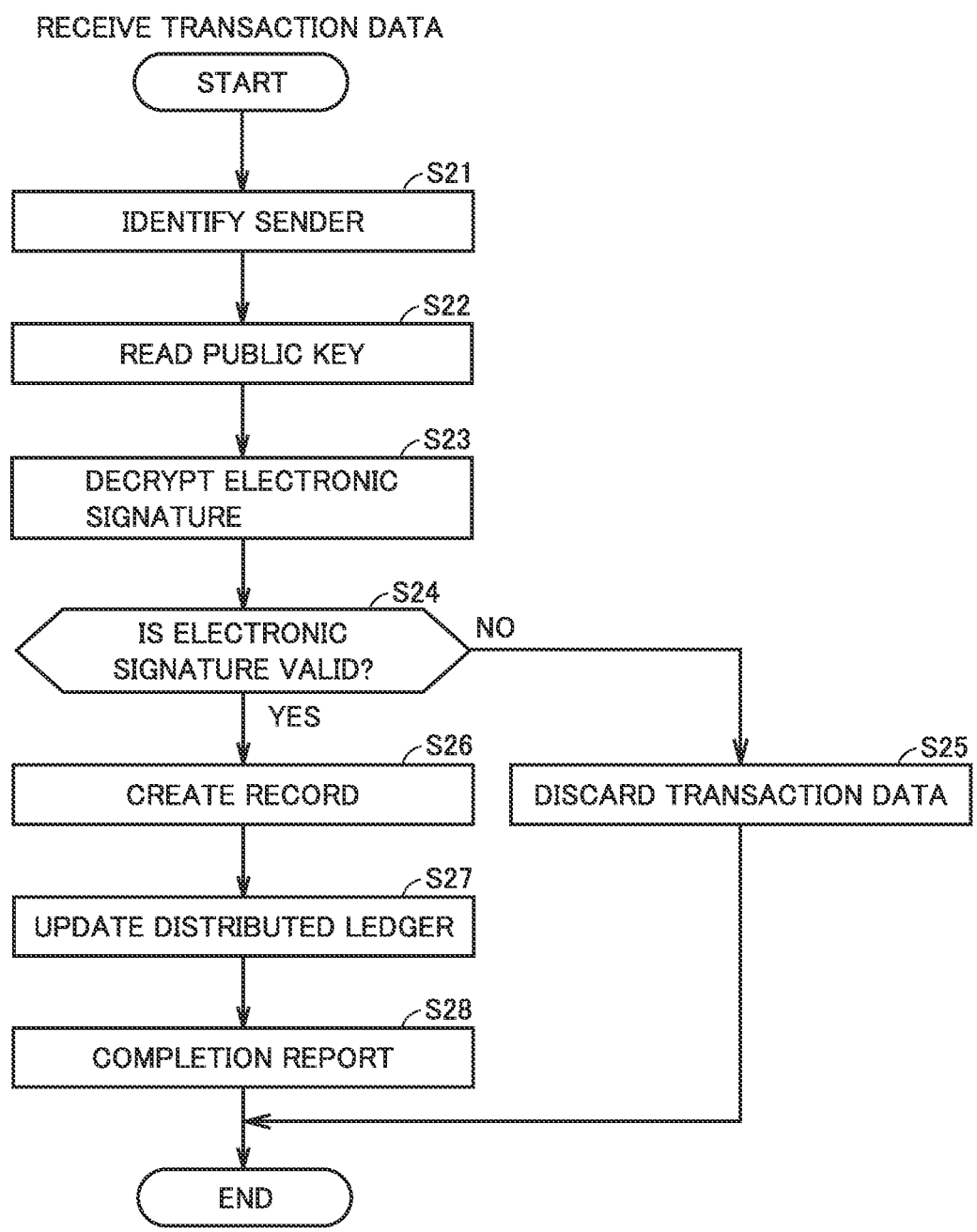
FIG. 10 is a flowchart showing a procedure in processing performed at the time when transaction data is received.

FIG. 10 is a flowchart showing a procedure in processing performed at the time when transaction data is received. Processing in the flowchart shown in FIG. 10 is performed by controller 21 when it receives the transaction data.

In S21, controller 21 identities based on sender information included in the received transaction data, client server 2 which is the sender of the transaction data.

In S22, controller 21 reads the public key of client server 2 identified in S21 from storage device 27.

In S23, controller 21 decrypts the electronic signature included in the transaction data with the public key read in S22.

In S24, controller 21 verifies validity of the electronic signature decrypted in S23. Specifically, controller 21 compares a value resulting from decryption of the electronic signature with Obj-HV (the hash value or the time stamp token) included in the transaction data. When they do not match with each other, controller 21 does not acknowledge validity of the electronic signature (NO in S24) and has the process proceed to S25. When they match with each other, controller 21 acknowledges validity of the electronic signature (YES in S24) and has the process proceed to S26.

In S25, controller 21 discards the presently received transaction data and quits the process because the electronic signature is invalid. Controller 21 may have the possibility of tampering of the transaction data shown on display apparatus 26. Alternatively, controller 21 may transmit the possibility of tampering of the transaction data to client server 2 which is the sender of the transaction data.

In S26, controller 21 reads such information as Key, Age, Obj-HV, Nonce, Sig, Prev-HV, and HV from the received transaction data and creates a record including the information.

In S27, controller 21 identifies based on Key in the record created in S26, a distributed ledger to which the record is to be added. Then, controller 21 adds the record to the identified distributed ledger. Distributed ledger set 50 is thus updated.

In S28, controller 21 transmits a notification (a completion report) indicating completion of transaction processing to client server 2 which is the sender of the transaction data.

As set forth above, in data management system 1 according to the first embodiment, distributed ledger set 50 including two distributed ledgers 51 and 52 is held in client server 2. Distributed ledger 51 is the proof chain for proving existence of the component data of the first component and distributed ledger 52 is the proof chain for proving existence of the component data of the second component. When the second operation to simultaneously update the component data of the first component and the component data of the second component is performed, client server 2 adds the record including the hash value of the updated component data of the first component to distributed ledger 51 and adds the record including the hash value of the updated component data of the second component to distributed ledger 52. Then, client server 2 generates the terminal hash value including the record hash value of the record added to distributed ledger 51 and the record hash value of the record added to distributed ledger 52. Then, client server 2 obtains the time stamp token for the terminal hash value. By obtaining the time stamp token for the terminal hash value, for example, as in the example in FIG. 3, existence of component data D10 to D13 of the first component and existence of component data D20 to D22 of the second component at the time proven by the time stamp token can be proven. Registration of component data D14 and component data D23 at a time point after the time point when the time stamp token was obtained can be proven. In other words, existence of component data D14 and component data D23 after storage of component data D10 to D13 and component data D20 to D22 can be proven. According to data management system 1 according to the first embodiment, man-hours, cost, and load imposed on the system can be less than in an example where the time stamp token is obtained for a record hash value of a record each time the record is added to each of distributed ledgers 51 and 52.

By incorporating the time stamp token into the record in at least one distributed ledger included in distributed ledger set 50, tamper resistance of the time stamp token can be enhanced.

First Modification

In the first embodiment, existence proof processing, that is, processing for generating the terminal hash value and obtaining the time stamp token, is performed when the second operation to simultaneously update the component data of the first component and the component data of the second component is performed. In other words, in the first embodiment, existence proof processing is performed as being triggered by an operation by the user. Existence proof processing, however, may automatically be performed. For example, existence proof processing may be performed when a prescribed time period has elapsed since the time stamp token was previously obtained. In other words, existence proof processing may be performed every prescribed time period. Then, the obtained time stamp token may be stored in a record in at least any one distributed ledger in distributed ledger set 50. The configuration in the first modification can also achieve an effect the same as in the first embodiment.

Second Embodiment

An example in which the time stamp token Obtained for the terminal hash value is stored in distributed ledger set 50 (at least any one of distributed ledgers 51 and 52) in data management system 1 according the first embodiment is described. Tamper resistance of the time stamp token is thus enhanced. In a second embodiment, an example in which tamper resistance of the time stamp token is enhanced with another method will be described.

Figure 11:
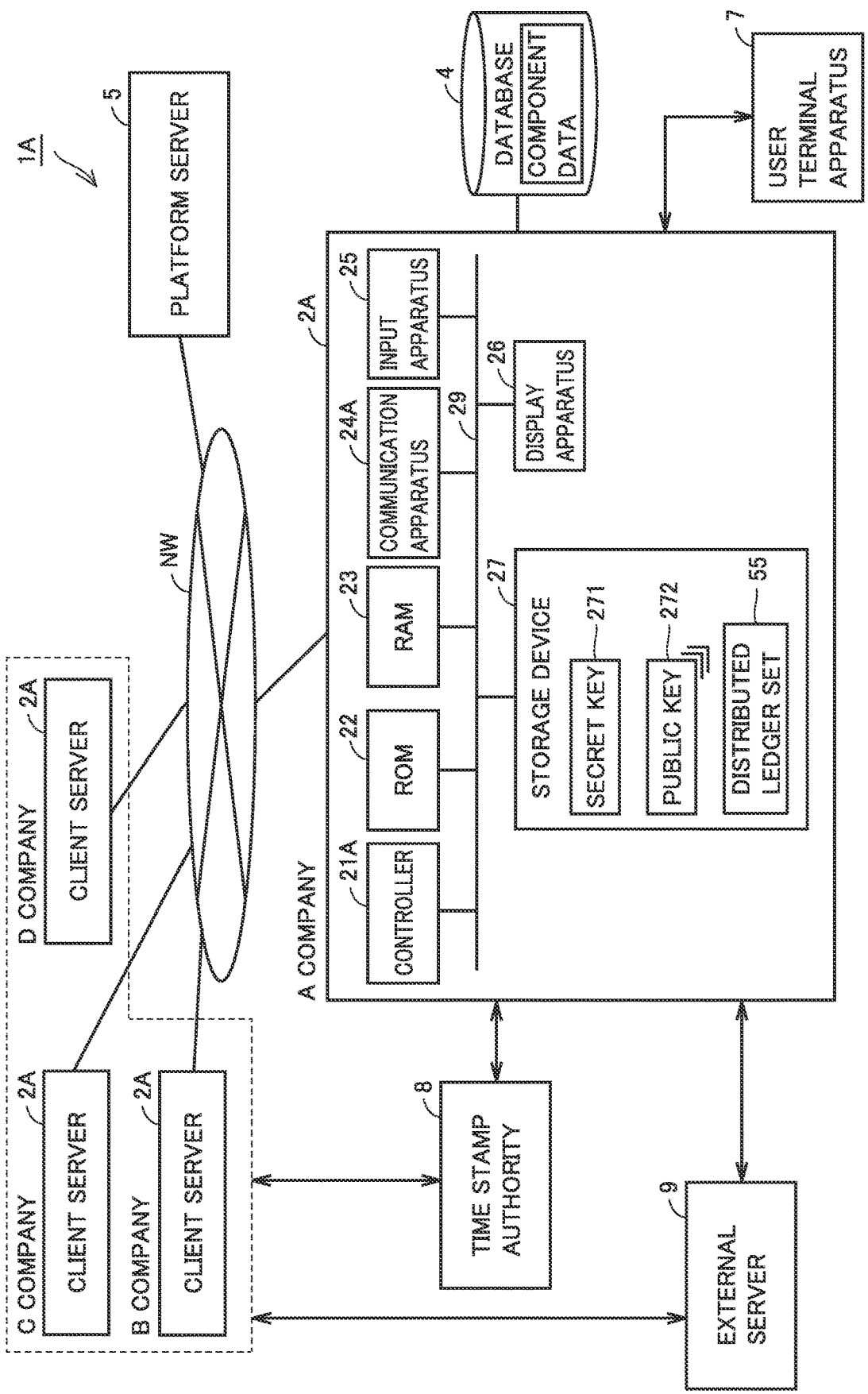
FIG. 11 is a diagram showing a schematic configuration of a data management system according to a second embodiment.

FIG. 11 is a diagram showing a schematic configuration of a data management system 1A according to the second embodiment. Data management system 1A is different from data management system 1 according to the first embodiment in that client server 2 is changed to a client server 2A and data management system 1A further includes an external server 9. Since data management system 1A is otherwise similar in configuration to data management system 1 according to the first embodiment, description thereof will not be repeated.

Client server 2A is different from client server 2 according to the first embodiment in that controller 21 is changed to a controller 21A, communication apparatus 24 is changed to a communication apparatus 24A, and distributed ledger set 50 included in storage device 27 is changed to a distributed ledger set 55. Since client server 2A is otherwise similar in configuration to client server 2 according to the first embodiment, description thereof will not be repeated.

FIG. 12 is a diagram showing an exemplary configuration of distributed ledger set 55 according to the second embodiment. Referring to FIG. 12, distributed ledger set 55 includes a distributed ledger 56 serving as a proof chain of component data of the first component where a state of update of the component data of the first component is stored in a time-series manner and a distributed ledger 57 serving as a proof chain of component data of the second component where a state of update of the component data of the second component is stored in a time-series manner. A record including such information as "Key", "Age", "Obj-HV", "Nonce", "Sig", "Prev-HV", and "HV" is stored in a time-series manner in distributed ledgers 56 and 57, similarly to distributed ledgers 51 and 52 according to the first embodiment.

Referring to FIGS. 11 and 12, client server 2A and client server 2 are different from each other in tinting of performing existence proof processing (processing for generating the terminal hash value and obtaining the time stamp token). Client server 2 according to the first embodiment performs existence proof processing in response to the second request indicating that the second operation to simultaneously update the component data of the first component and the component data of the second component has been performed. Client server 2A according to the second embodiment performs existence proof processing in response to a third request indicating that a third operation to request obtainment of the time stamp token has been performed.

In response to the first request and the second request, client server 2A (controller 21A) performs the processing in FIG. 8 described in the first embodiment and adds a record to distributed ledger 56 and/or distributed ledger 57. More specifically, when controller 21A updates, for example, database 4 in response to the first operation to update the component data of the first component, it adds the record including the hash value of the updated component data of the first component to distributed ledger 56. When controller 21A updates, for example database 4 in response to the first operation to update the component data of the second component, it adds the record including the hash value of the updated component data of the second component to distributed ledger 57. Furthermore, when controller 21A updates, for example, database 4 in response to the second operation to simultaneously update the component data of the first component and the second component, it adds the record including the hash value of the updated component data of the first component to distributed ledger 56 and adds the record including the hash value of the updated component data of the second component to distributed ledger 57. Client server 2A according to the second embodiment does not generate the terminal hash value and obtain the time stamp token in response to the second request. Since the processing in response to the first request and the second request in the second embodiment is as described with reference to FIGS. 5 and 8 in the first embodiment, details thereof will not repeatedly be described. Since processing at the time of reception of transaction data from other client servers 2A in the second embodiment is also as described with reference to FIGS. 7 and 10 in the first embodiment, details thereof will not repeatedly be described.

Figure 13:
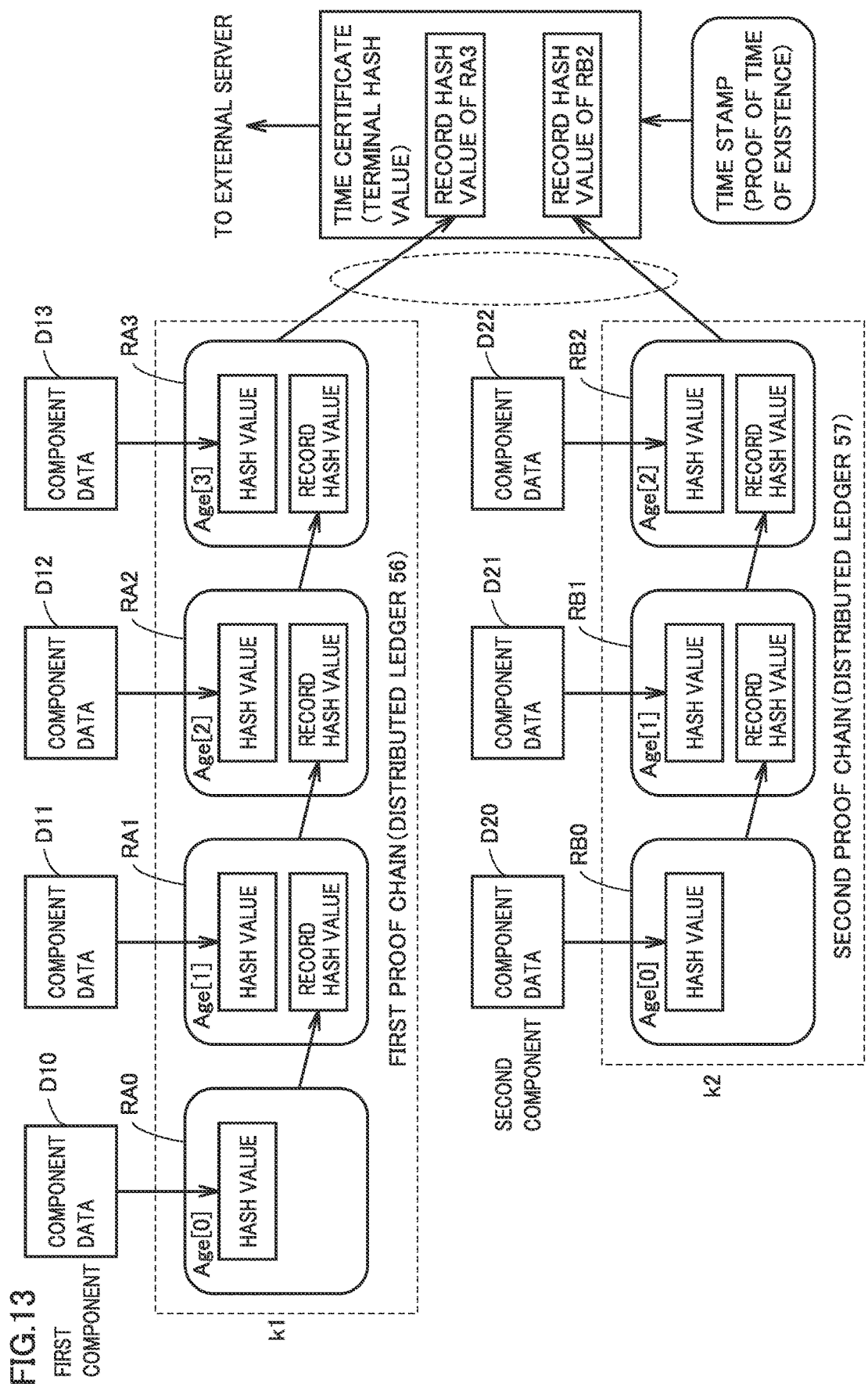
FIG. 13 is a diagram for illustrating existence proof processing in the second embodiment.

FIG. 13 is a diagram for illustrating existence proof processing in the second embodiment. An upper tier in FIG. 13 schematically shows distributed ledger 56 which is the proof chain of the first component and a lower tier in FIG. 13 schematically shows distributed ledger 57 which is the proof chain of the second component.

A record including a hash value of the component data of the first component is stored in a time-series manner in the first proof chain (distributed ledger 56). A record including a hash value of the component data of the second component is stored in a time-series manner in the second proof chain (distributed ledger 57). As shown in FIG. 13, it is assumed that, in distributed ledger 56, record RA3 of Age "3" is the latest (terminal) record, and in distributed ledger 57, record RB2 of Age "2" is the latest (terminal) record. Then, it is assumed that the third operation to request obtainment of the time stamp token is performed onto input apparatus 25 or user terminal apparatus 7 in this state.

As input apparatus 25 or user terminal apparatus 7 accepts the third operation, it outputs the third request indicating that the third operation has been performed. The third operation may be, for example, an operation to select a button to request obtainment of the time stamp token shown on the display screen of display apparatus 26 or user terminal apparatus 7. When controller 21A receives the third request, it generates a terminal hash value including the record hash value of record RA3 at the terminal in distributed ledger 56 and the record hash value of record RB2 at the terminal in distributed ledger 57. Then, controller 21A transmits the terminal hash value to time stamp authority 8 through communication apparatus 24A. Time stamp authority 8 transmits to client server 2A, the time stamp token in which the terminal hash value is linked to time information based on a time source with followability to international standard time. Controller 21A has the time stamp token stored in storage device 27 as a time certificate. In the second embodiment as well, by obtaining the time stamp token for the terminal hash value including the record hash value of record RA3 at the terminal in distributed ledger 56 and the record hash value of record RB2 at the terminal in distributed ledger 57, existence of component data D10 to D13 of the first component and existence of component data D20 to D22 of the second component at the time proven by the time stamp token can be proven. When a record is added to distributed ledgers 56 and 57 after the time stamp token was obtained, registration of the component data corresponding to the record at time after the time proven by the time stamp token can be proven. Man-hours, cost, and load imposed on the system can be less than in an example where the time stamp token is obtained for a record hash value of a record each time the record is added to each of distributed ledgers 56 and 57.

Communication apparatus 24A is further configured to communicate with external server 9. Controller 21A transmits the time certificate to external server 9 through communication apparatus 24A.

External server 9 is a server disconnected from network NW (that is, a server that does not participate in network NW) and managed by a management entity which is none of the A company, the B company, the C company, and the D company. Storage of time certificate in storage device 27 and management thereof as well as management of the time certificate also in external server 9 can enhance tamper resistance of the time certificate (that is, the time stamp token).

Figure 14:
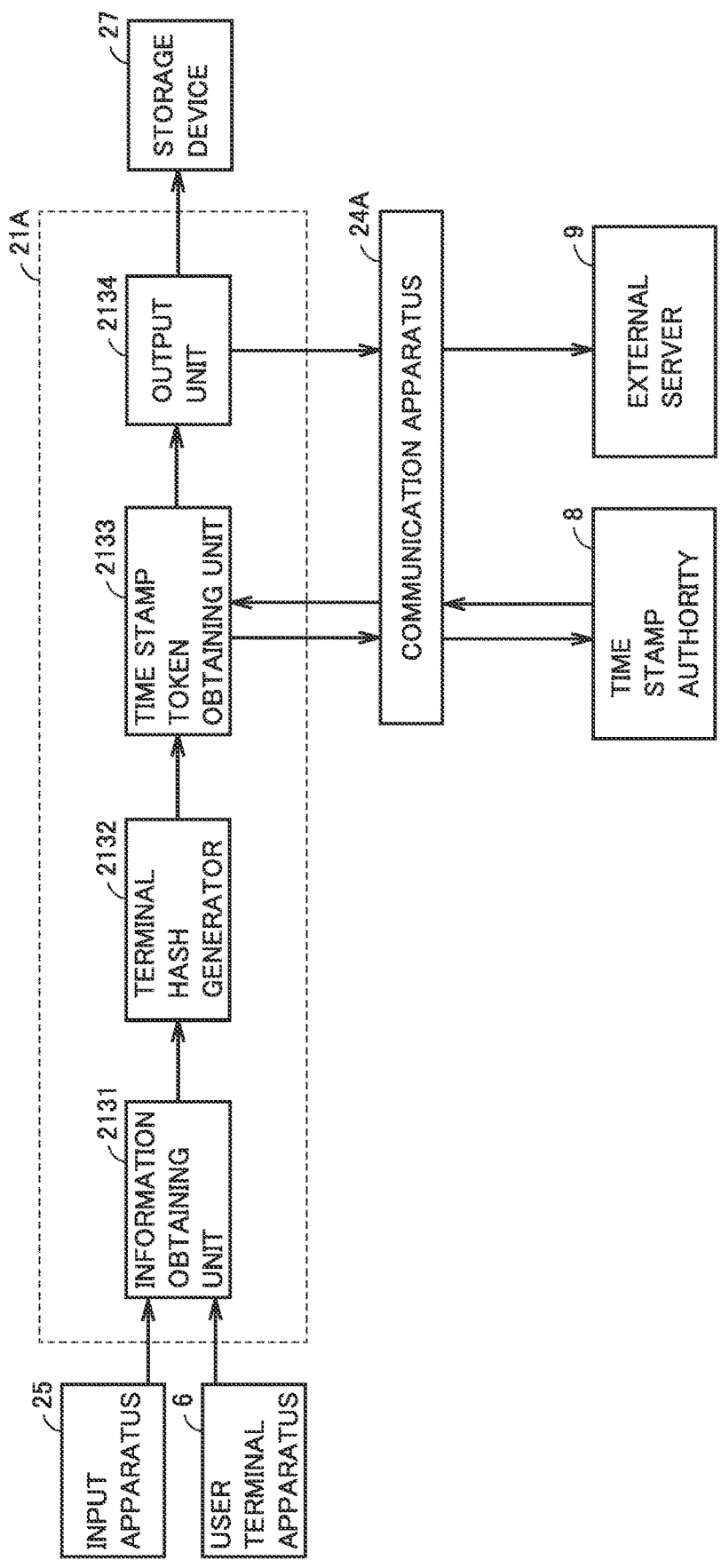
FIG. 14 is a functional block diagram of a controller for performing existence proof processing in the second embodiment.

FIG. 14 is a functional block diagram of controller 21A for performing existence proof processing in the second embodiment. Referring to FIG. 14, controller 21A includes an information obtaining unit 2131, a terminal hash generator 2132, a timestamp token Obtaining unit 2133, and an output unit 2134. Controller 21A functions as information obtaining unit 2131, terminal hash generator 2132, timestamp token obtaining unit 2133, and output unit 2134, for example, by executing a program stored in ROM 22. Information obtaining unit 2131, terminal hash generator 2132, timestamp token obtaining unit 2133, and output unit 2134 may be implemented, for example, by dedicated hardware (electronic circuitry).

As the third operation is performed onto input apparatus 25 or user terminal apparatus 7, input apparatus 25 or user terminal apparatus 7 outputs the third request indicating that the third operation has been performed.

Information obtaining unit 2131 obtains the third request from input apparatus 25 or user terminal apparatus 7. For example, when a user of client server 2A operates input apparatus 25 to select a button to request obtainment of the time stamp token (perform the third operation) or the display screen of display apparatus 26, the third request is inputted to information obtaining unit 2131. When information obtaining unit 2131 obtains the third request, it outputs the third request to terminal hash generator 2132.

When terminal hash generator 2132 receives the third request, it generates the record hash value of the latest (terminal) record stored in distributed ledger 56 and the record hash value of the latest (terminal) record stored in distributed ledger 57 and generates the terminal hash value including them. Terminal hash generator 2132 outputs the generated terminal hash value to timestamp token obtaining unit 2133.

Timestamp token obtaining unit 2133 outputs to communication apparatus 24A, a control signal for transmitting the terminal hash value received from terminal hash generator 2132 to time stamp authority 8. The terminal hash value is thus transmitted to time stamp authority 8 through communication apparatus 24A.

Time stamp authority 8 that has received the terminal hash value sends the time stamp token back to client server 2.

Timestamp token obtaining unit 2133 receives the time stamp token from time stamp authority 8 through communication apparatus 24A. Time stamp token obtaining unit 2133 outputs the obtained time stamp token to output unit 2134.

Output unit 2134 has the time stamp token received from timestamp token obtaining unit 2133 stored in storage device 27. Alternatively, output unit 2134 may have the time stamp token received from timestamp token obtaining unit 2133 stored in database 4. Proof of time of existence of the component data of the first component and the component data of the second component can thus be obtained.

Furthermore, output unit 2134 transmits the time stamp token received from timestamp token obtaining unit 2133 to external server 9 as the time certificate. Specifically, output unit 2134 outputs to communication apparatus 24A, a control signal for transmitting the time certificate to external server 9. The time certificate is thus transmitted to external server 9 through communication apparatus 24A and the time certificate is managed in external server 9. For example, in order to tamper the time stamp token, in addition to the time stamp token managed in client server 2A, the time certificate (time stamp token) managed in external server 9 should also be tampered. By managing the time certificate also in external server 9, tamper resistance of the time stamp token can be enhanced.

Figure 15:
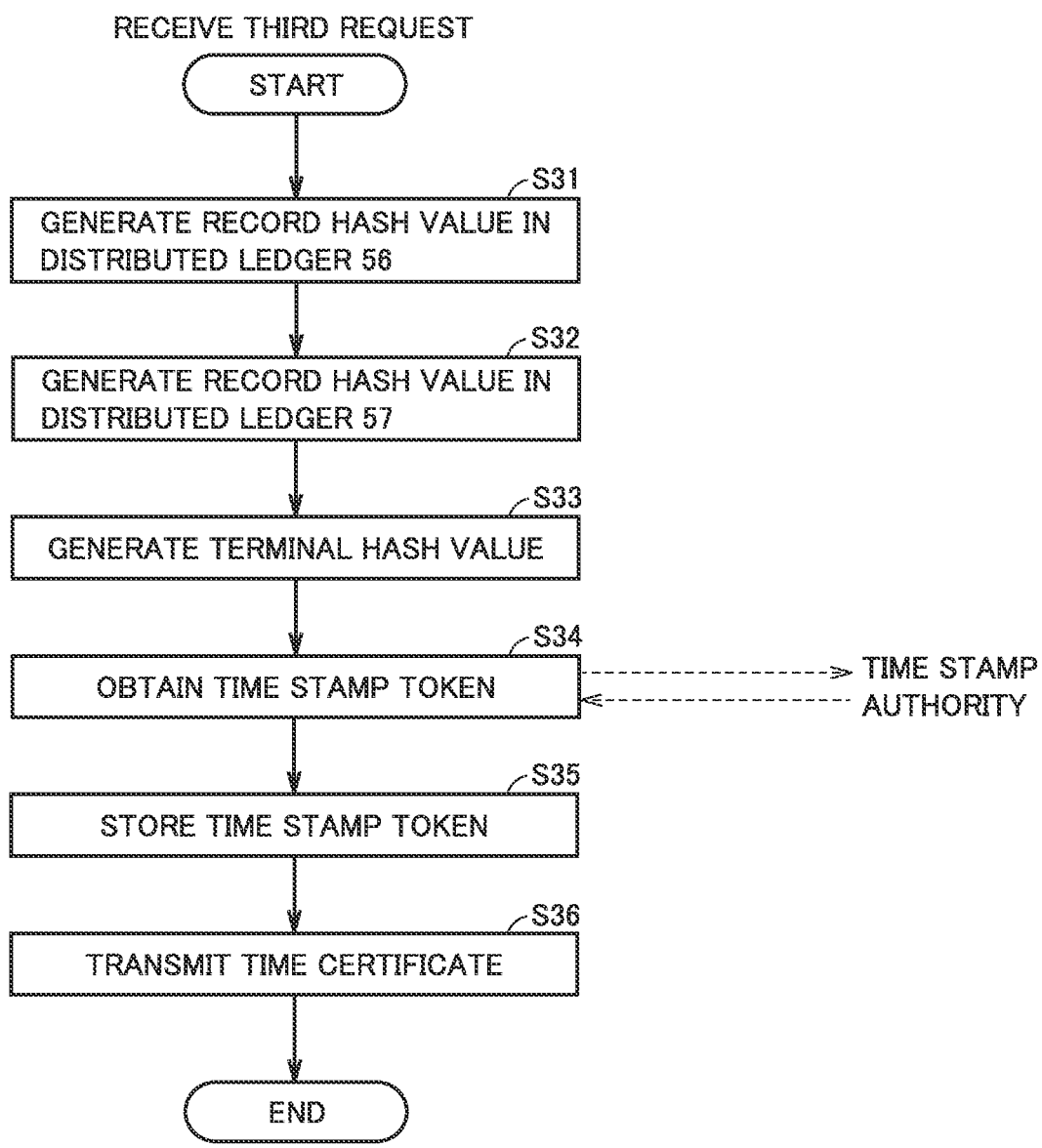
FIG. 15 is a flowchart showing a procedure in processing for obtaining a time stamp token.

FIG. 15 is a flowchart showing a procedure in processing for obtaining a time stamp token. Processing in the flowchart shown in FIG. 15 is performed by controller 21A when it receives the third request from input apparatus 25 or user terminal apparatus 7.

In S31, controller 21A generates the record hash value of the latest (terminal) record stored in distributed ledger 56.

In S32, controller 21A generates the record hash value of the latest (terminal) record stored in distributed ledger 57.

In S33, controller 21A generates the terminal hash value including the record hash values generated in S31 and S32.

In S34, controller 21A obtains the time stamp token for the terminal hash value generated in S33. Specifically, controller 21A outputs to communication apparatus 24A, the control signal for transmitting the terminal hash value to time stamp authority 8. The record hash value is thus transmitted to time stamp authority 8 through communication apparatus 24A. Then, controller 21A obtains the time stamp token for the terminal hash value from time stamp authority 8 through communication apparatus 24A.

In S35, controller 21A has the time stamp token obtained in S34 stored in storage device 27. Controller 21A may have the time stamp token stored in database 4.

In S36, controller 21A transmits the time stamp token obtained in S34 to external server 9 as the time certificate. Specifically, controller 21A outputs to communication apparatus 24A, the control signal for transmitting the time certificate to external server 9. The time certificate is thus transmitted to external server 9 through communication apparatus 24A.

As set forth above, in data management system 1A according to the second embodiment, client server 2A obtains the time stamp token for the terminal hash value including the record hash values of the latest (terminal) records in two distributed ledgers 56 and 57 in response to the third operation, Then, client server 2A has the time stamp token stored in storage device 27 and transmits the time stamp token (time certificate) to external server 9. By managing the time stamp token also in external server 9, tamper resistance of the time stamp token can be enhanced.

Third Embodiment

An example in which platform server 5 performs a function to permit participation into network NW is described in the first embodiment. Then, finality of transaction data is given by confirmation of validity of the electronic signature between client servers 2 permitted to participate in network NW. In a third embodiment, an example in which a platform server 6 performs a function to give finality to transaction data in addition to the function to permit participation into network NW will be described.

Figure 16:
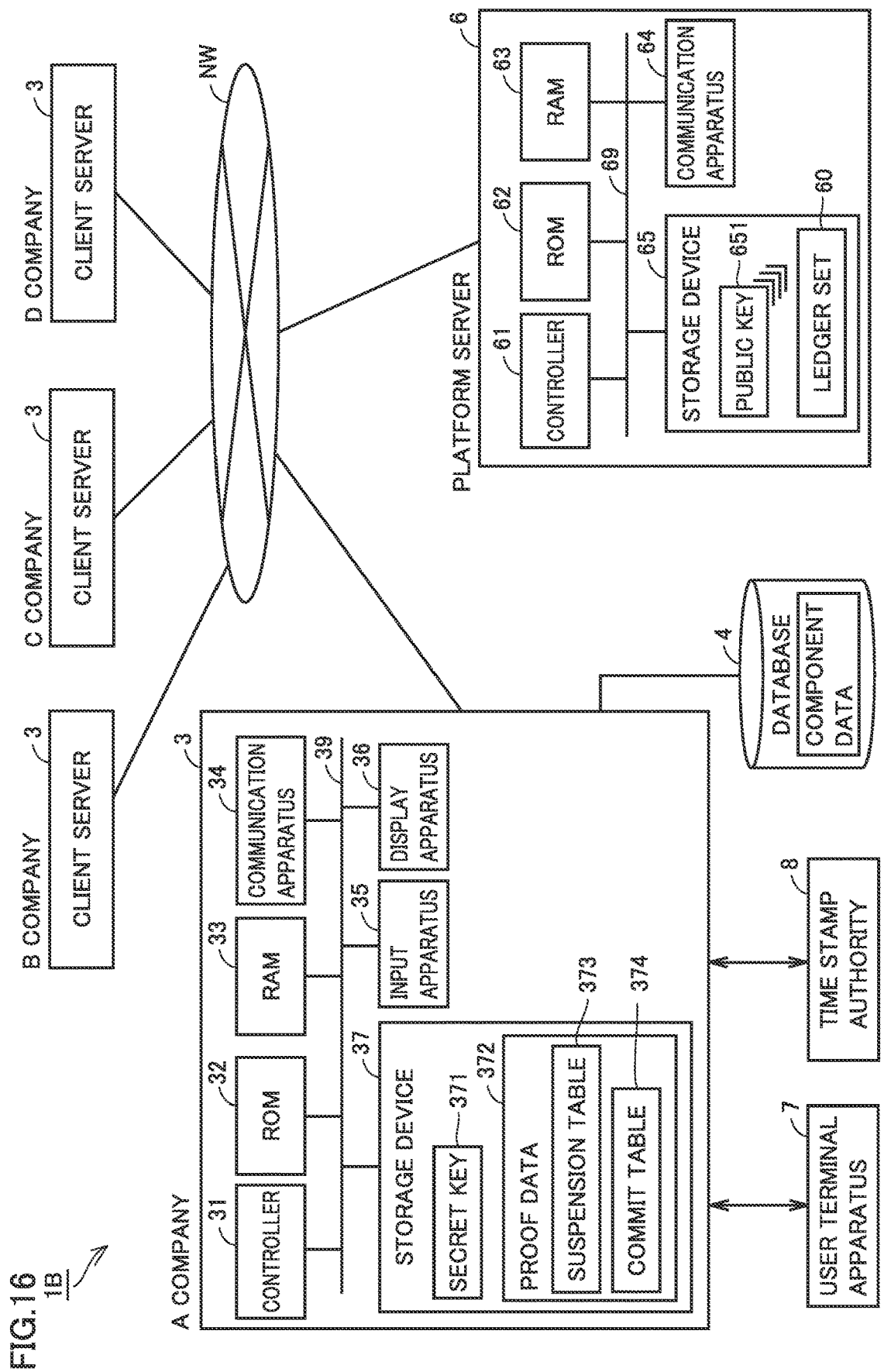
FIG. 16 is a diagram showing a schematic configuration of a data management system according to a third embodiment.

FIG. 16 is a diagram showing a schematic configuration of a data management system 1B according to the third embodiment. Data management system 1B is equivalent in function to data management system 1 according to the first embodiment. Data management system 19 includes four client servers 3, platform server 6, and time stamp authority 8. As in the first embodiment, four client servers 3 are servers belonging to different companies (for example, the A company, the B company, the C company, and the D company). Though client server 3 of the A company will representatively be described below, client servers 3 of the B company, the C company, and the D company are also similar in function.

Similarly to platform server 5 according to the first and second embodiments, platform server 6 manages network NW and accepts an application to participate in network NW from each client server 3. Platform server 6 permits participation of client server 3 into network NW based on an operation to permit participation by a manager of platform server 6 or based on a result of determination as to a prescribed condition. Participation of four client servers 3 belonging to the A company, the B company, the C company, and the D company into network NW is permitted also in the third embodiment.

Four client servers 3 and platform server 6 form network NW. Software based on the distributed ledger has been introduced in each of client servers 3, and as the introduced software based on the distributed ledger functions, each of client servers 3 functions as a node. Client server 3 is configured to communicate with user terminal apparatus 7 similarly to client server 2 according to the first embodiment.

Similarly to client server 2 according to the first embodiment, database 4 is connected to client server 3. Client server 3 (a controller 31) generates a control signal for storing/updating component data and outputs the control signal to database 4 in response to an input to an input apparatus 35 or a request from user terminal apparatus 7.

As client server 3 has component data stored in database 4/updates component data in database 4, it creates a hash value of the component data and generates transaction data for storing the hash value in a ledger held in platform server 6 and a distributed ledger held in each client server 3. Then, client server 3 transmits the generated transaction data to platform server 6.

Platform server 6 performs a function to give finality to the transaction data A ledger set 60 is held in platform server 6, and platform server 6 processes transaction data received from client server 3 and updates ledger set 60. As platform server 6 updates ledger set 60, it transmits a record (a proof record which will be described later) added to the ledger by updating to all client servers 3 that participate in network NW. A commit table 374 where a commit record is stored is stored in client server 3 and client server 3 has the proof record received from platform server 6 stored in commit table 374 as the commit record. Commit table 374 corresponds to an exemplary "distributed ledger" according to the present disclosure.

FIG. 17 is a diagram showing an exemplary configuration of ledger set 60. Ledger set 60 includes a ledger 67 and a ledger 68. Similarly to distributed ledge 51 according to the first embodiment, a state of update of the component data of the first component is stored in a time-series manner in ledger 67, and ledger 67 forms a proof chain of the component data of the first component. Similarly to distributed ledger 52 according to the first embodiment, a state of update of the component data of the second component is stored in a time-series manner in ledger 68, and ledger 68 forms a proof chain of the component data of the second component. Since ledger set 60, ledger 67, and ledger 68 are similar in configuration to distributed ledger set 50, distributed ledger 51, and distributed ledger 52 according to the first embodiment, respectively, detailed description thereof will not be repeated. FIG. 17 shows a data structure of ledgers 67 and 68 corresponding to the example shown in FIG. 3. In other words, a record of Age "3" is stored in each of ledgers 67 and 68 as the latest (terminal) record.

Referring again to FIG. 16, client server 3 includes controller 31, a ROM 32, a RAM 33, a communication apparatus 34, input apparatus 35, a display apparatus 36, and a storage device 37. Controller 31, ROM 32, RAM 33, communication apparatus 34, input apparatus 35, display apparatus 36, and storage device 37 are connected to a bus 39. Since ROM 32, RAM 33, communication apparatus 34, input apparatus 35, and display apparatus 36 are basically similar in configuration to ROM 22, RAM 23, communication apparatus 24, input apparatus 25, and display apparatus 26 of client server 2 according to the first embodiment, description thereof will not be repeated.

A secret key 371 and proof data 372 are stored in storage device 37. Secret key 371 is a secret key of the A company. For example, in participation of client server 3 into network NW for the first time, controller 31 generates a secret key and a public key. Then, controller 31 transmits the generated public key to an authentication bureau (not shown) and has the public key authenticated. The authentication bureau issues an electronic certificate including information on the public key. Controller 31 has secret key 371 corresponding to the authenticated public key stored in storage device 37. Controller 31 transmits an authenticated public key (electronic certificate) 651 to platform server 6.

Figure 18:
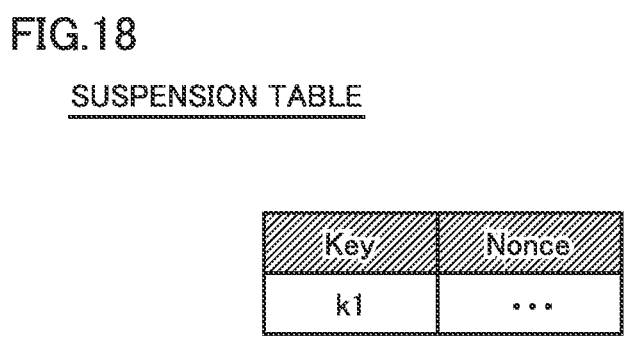

Proof data 372 includes a suspension table 373 and commit table 374. FIG. 18 is a diagram for illustrating an exemplary configuration of suspension table 373. FIG. 19 is a diagram for illustrating an exemplary configuration of commit table 374. Suspension table 373 and commit table 374 each includes a record for each target component.

Referring to FIG. 18, suspension table 373 includes a prescribed type of information included in transaction data that has not been used. Specifically, for example, a suspension record including such information as Key and Nonce is stored in suspension table 373. Of information included in the transaction data generated in response to the first request Or the second request, controller 31 has such information as Key and Nonce stored as the suspension record in suspension table 373. The First request and the second request received by client server 3 from input apparatus 35 or user terminal apparatus 7 each include an ID of a target component. For example, when the first request relates to the first component, an ID indicating "k1" is included in the first request, and when the first request relates to the second component, an ID indicating "k2" is included in the first request. The second request includes the ID indicating "k1" and the ID indicating "k2". In other words, the ID of the target component included in the first request or the second request is set as Key. When controller 31 receives the first request or the second request, it generates a nonce value. The nonce value indicates a number of processing for the first request or the second request (that is, a number of transaction data). Controller 31 creates the suspension record including such information as Key and Nonce and has the suspension record registered in suspension table 373. FIG. 18 shows an example in which the suspension record including Key set to k1 is registered in suspension table 373. When the first request and the second request are not particularly distinguished from each other, they will also collectively be referred to as an "update request" below.

When processing for responding to the update request is performed (that is, transaction data is used), controller 31 deletes the suspension record including Key information similar to Key included in the transaction data used for performing transaction processing from suspension table 373.

A suspension record including the same Key information is not redundantly registered in suspension table 373. In registration of the suspension record in suspension table 373, controller 31 determines whether or not a suspension record including Key that matches with Key included in the suspension record to be registered has already been registered in suspension table 373. When the suspension record including Key that matches with Key included in the suspension record to be registered has not been registered in suspension table 373, controller 31 has the suspension record registered in suspension table 373. When the suspension record including Key that matches with Key included in the suspension record to be registered has been registered in suspension table 373, controller 31 waits for deletion of the suspension record including matching Key from suspension table 373. In other words, in the example shown in FIG. 18, the suspension record including Keyset to k2 can be registered in suspension table 373, whereas the suspension record including Key set to k1 cannot be registered.

Commit table 374 includes a prescribed type of information included in used transaction data. Specifically, a commit record including such information as Key, Age, Obj-HV, Nonce, Sig, Prev-HV, and HV is stored in commit table 374. In the third embodiment, the commit record includes information similar to that in the record in ledger set 60. Commit table 374 includes commit data 375 where a commit record including Key set to k1 is stored and commit data 376 where a commit record including Key set to k2 is stored.

As platform server 6 performs transaction processing to update the ledger in ledger set 60, it creates the proof record and transmits the proof record to all client servers 3 that participate in network NW. The proof record is, for example, a record including such information as Key, Age, Obj-HV, Nonce, Sig, Prev-HV, and HV that is included in a record added to the ledger by transaction processing performed with the use of the transaction data.

As controller 31 receives the proof record, it adds the proof record to commit table 374 (commit data 375 or commit data 376) as the commit record. Then, controller 31 deletes the suspension record including Key similar to Key included in the added commit record from suspension table 373.

Referring again to FIG. 16, platform server 6 includes a controller 61, a ROM 62, a RAM 63, a communication apparatus 64, and a storage device 65. Controller 61, ROM 62, RAM 63, communication apparatus 64, and storage device 65 are connected to a bus 69.

Controller 61 is implemented by an integrated circuit including a CPU Controller 61 develops various programs stored in ROM 62 on RAM 63 and executes the programs. The various programs include an operating system and the like. RAM 63 functions as a working memory, and various types of data necessary for execution of various programs are temporarily stored therein. Controller 61 receives transaction data from client server 3 and performs transaction processing.

Communication apparatus 64 is configured to communicate with client server 3 that participates in network NW.

A plurality of public keys 651 and ledger set 60 are stored in storage device 65. The plurality of public keys 651 include public keys of companies that manage client servers 3 that participate in network NW. Specifically, the plurality of public keys 651 include the public key of the A company, the public key of the B company, the public key of the C company, and the public key of the D company.

Ledger set 60 is similar in configuration to distributed ledger set 50 according to the first embodiment as described above.

Processing for responding to the update request (the first request and the second request) in the third embodiment will sequentially be described below with reference to a flowchart.

FIG. 20 is a flowchart showing a procedure in processing performed in data management system 1B at the time when the update request (the first request or the second request) is received. Processing in the flowchart shown in FIG. 20 is started by controller 31 of client server 3 when it receives the update request (the first request or the second request) from input apparatus 25 or user terminal apparatus 7.

In S40, controller 31 of client server 3 generates a nonce value. The nonce value is used as a number of transaction data generated in response to the update request.

In S41, controller 31 of client server 3 generates a suspension record. Specifically, controller 31 of client server 3 reads an ID of a target component included in the update request, and generates the suspension record with the ID being set as Key information and with the nonce value generated in S40 being set as Nonce information. When the update request falls under the second request, controller 31 generates the suspension record including the ID (k1) of the first component as Key information and the suspension record including the ID (k2) of the second component as Key information.

In S42, controller 31 of client server 3 determines whether or not the suspension record generated in S41 can be registered in suspension table 373. When a suspension record including Key information similar to that in the suspension record generated in S41 has been registered in suspension table 373, controller 31 of client server 3 makes negative determination (NO in S42) and waits for deletion of the suspension record including similar Key information from suspension table 373. When a suspension record including Key information similar to that in the suspension record generated in S41 has not been registered in suspension table 373, controller 31 of client server 3 makes affirmative determination (YES in S42) and has the process proceed to S43.

In S43, controller 31 of client server 3 has the suspension record registered in suspension table 373.

In S44, controller 31 of client server 3 generates transaction data for responding to the update request. Specifically, when the update request falls under the first request, controller 31 of client server 3 performs processing similar to the processing in S2 to S4 described with reference to FIG. 8 to generate transaction data. When the update request falls under the second request, controller 31 of client server 3 performs processing similar to the processing in S11 described with reference to FIG. 9 to generate respective pieces of transaction data corresponding to update of the first component and the second component. Furthermore, when the update request falls under the second request, controller 31 of client server 3 performs processing similar to the processing in S13 to S16 described with reference to FIG. 9 to generate transaction data. Since details of the processing are as described with reference to FIGS. 8 and 9, description will not be repeated.

In S45, controller 31 of client server 3 outputs to communication apparatus 34, a control signal for transmitting the transaction data generated in S44 to platform server 6. The transaction data is thus transmitted to platform server 6 through communication apparatus 34.

In S50, controller 61 of platform server 6 decrypts the electronic signature for verifying validity of the electronic signature included in the received transaction data. Specifically, controller 61 of platform server 6 performs processing similar to the processing in S21 to S23 described with reference to FIG. 10 to decrypt the electronic signature. Since details of the processing are as described with reference to FIG. 10, description will not be repeated.

In S51, controller 61 of platform server 6 verifies validity of the electronic signature decrypted in S50. Specifically, controller 61 of platform server 6 compares the value obtained by decryption of the electronic signature with the hash value included in the transaction data (in the transaction data generated in response to the first request, the hash value of the component data of the target component, and in the transaction data generated in response to the second request, the time stamp token). When they do not match with each other, controller 61 of platform server 6 does not acknowledge validity of the electronic signature (NO in S51) and has the process proceed to S52. When they match with each other, controller 61 of platform server 6 acknowledges validity of the electronic signature (YES in S51) and has the process proceed to S53.

In S52, controller 61 of platform server 6 determines that the transaction data received from client server 3 may have been tampered, and discards the transaction data and creates an abnormality report indicating possibility of tampering. Then, controller 61 of platform server 6 has the process proceed to S56.

In S53, controller 61 of platform server 6 performs transaction processing. Specifically, controller 61 of platform server 6 performs processing similar to the processing in S26 and S27 described with reference to FIG. 10 to generate a record in the ledger identified by Key information included in the transaction data, to add the generated record to the ledger, and to update ledger set 60.

In S54, controller 6 of platform server 6 generates a proof record. The proof record includes such information as Key, Age, Obj-HV, Nonce, Sig, Prev-HV, and HV included in the record added to the ledger.

In S55, controller 61 of platform server 6 creates a normality report indicating completion of update of ledger set 60 (that is, processing of the transaction data). Controller 61 of platform server 6 has the proof record included in the normality report.

In S56, controller 61 of platform server 6 outputs to communication apparatus 64, a control signal for transmitting the abnormality report created in S52 or the normality report created in S55 to client server 3 which is the sender of the transaction data. The abnormality report or the normality report is thus transmitted to client server 3 through communication apparatus 64.

In S56, controller 61 of platform server 6 outputs to communication apparatus 64, a control signal for transmitting the proof record to client servers 3 (for example, client servers 3 of the B company, the C company, and the D company) other than the sender of the transaction data. The proof record is thus transmitted to other client servers 3 through communication apparatus 64.

In S46, controller 31 of client server 3 determines whether or not it has received the normality report from platform server 6. When controller 31 of client server 3 determines that it has received the normality report (YES in S46), it has the process proceed to S47. When controller 31 of client server 3 determines that it has not received the normality report, that is, it has received the abnormality report (NO in S46), it has the process proceed to S49.

In S47, controller 31 of client server 3 adds the proof record included in the normality report to commit table 374 as the commit record. Specifically, controller 31 of client server 3 determines whether the commit record is to be added to commit data 375 or commit data 376 based on Key information in the proof record. Then, controller 31 of client server 3 adds the commit record to the target commit data.

In S48, controller 31 of client server 3 deletes the suspension record including the Key information the same as that in the added commit record from suspension table 373.

In S49, controller 31 of client server 3, for example, has a result of processing for the update request shown on display apparatus 36 or transmits the result to user terminal apparatus 7.

As other client servers 3 (client servers 3 of the B company, the C company, and the D company) that have received the proof record transmitted in S56 similarly also add the proof record to respective commit tables 374, commit tables 374 are updated.

As set forth above, in data management system 1B according to the third embodiment, platform server 6 gives finality to the transaction data. Ledger set 60 including two ledgers 67 and 68 is held in platform server 6. The state of update of the component data of the first component is stored in the time-series manner in ledger 67, and the state of update of the component data of the second component is stored in the time-series manner in ledger 68. Then, as ledger set 60 is updated, the proof record including information on the record added to ledger set 60 is sent from platform server 6 to each client server 3. Each of client servers 3 adds the proof record to commit table 374 as the commit record. Commit table 374 corresponds to distributed ledger set 50 according to the first embodiment. In the configuration of data management system 1B according to the third embodiment as well, in response to the second request, the record hash values of the latest (terminal) records in two pieces of commit data 375 and 376 are generated and the terminal hash value including them is generated. Then, the time stamp token for the terminal hash value is obtained. By obtaining the time stamp token for the terminal hash value, for example, as in the example in FIG. 3 in the first embodiment, existence of the component data (for example, D10 to D13 in the example in FIG. 3) of the first component and existence of the component data (for example, D20 to D22 in the example in FIG. 3) of the second component at the time proven by the time stamp token can be proven.

By incorporating the time stamp token in the record into at least one ledger included in ledger set 60, the time stamp token is incorporated into at least one piece of commit data included in commit table 374. Tamper resistance of the time stamp token can thus be enhanced.

Second Modification

An example in which commit table 374 includes information similar to information included in ledger set 60 is described in the third embodiment. Specifically, each of pieces of commit data 375 and 376 in commit table 374 includes such information as Key, Age, Obj-HV, Nonce, Sig, Prev-HV, and HV. Commit table 374 may include some of information included in ledger set 60. For example, each of pieces of commit data 375 and 376 in commit table 374 may include such information as Key, Age, Obj-HV, HV, and Nonce, of such information as Key, Age, Obj-HV, Nonce, Sig, Prev-HV, and HV in each of ledgers 67 and 68 in ledger set 60. In this case, the proof record will also be generated to include such information as Key, Age, Obj-HV, and Nonce. In other words, commit data 375 and 376 are summaries of respective ledgers 67 and 68. By preparing commit data 375 and 376 as the summaries of respective ledgers 67 and 68, a capacity of data stored in storage device 37 of client server 3 can be suppressed as compared with an example where commit data 375 and 376 include information similar to that in ledgers 67 and 68.

Third Modification

The configuration in the second embodiment can also be combined with the third embodiment. In other words, in the third embodiment, existence proof processing may be performed in response to the third request. Such a configuration can also achieve an effect as in the second embodiment.

Though embodiments of the present disclosure have been described above, it should be understood that the embodiments disclosed herein are illustrative and non-restrictive in every respect. The technical scope of the present disclosure is defined by the terms of the claims and is intended to include any modifications within the scope and meaning equivalent to the terms of the claims.

What is claimed is:

1. A data management apparatus that manages data based on a distributed ledger technology, the data management apparatus comprising:
   memory where a distributed ledger is stored,
   a record including information on the data being stored in a time-series manner in the distributed ledger;
   a hardware processor configured to add the record to the distributed ledger; and
   a communication apparatus configured to communicate with a time stamp authority, wherein
   the data includes first data and second data,
   the distributed ledger includes
   a first distributed ledger where a record including first information on the first data is stored in a time-series manner, and
   a second distributed ledger where a record including second information on the second data is stored in a time-series manner, and
   the hardware processor is further configured to:
   generate a terminal value including information on a record at a terminal in the first distributed ledger and information on a record at a terminal in the second distributed ledger, and
   obtain a time stamp token for the terminal value from the time stamp authority through the communication apparatus.

2. The data management apparatus according to claim 1, wherein
   the hardware processor is further configured to cause a record including the time stamp token to be stored in at least one of the first distributed ledger and the second distributed ledger.

3. The data management apparatus according to claim 1, wherein
   the communication apparatus is further configured to communicate with an external server different from the data management apparatus, and
   the hardware processor is further configured to cause causes-the time stamp token to be stored in the memory and transmit the time stamp token to the external server through the communication apparatus.

4. The data management apparatus according to claim 1, wherein
   when the hardware processor causes the record including the first information to be stored in the first distributed ledger and causes the record including the second information to be stored in the second distributed ledger in response to update of the first data and the second data, the hardware processor generates the terminal value.

5. The data management apparatus according to claim 1, wherein
   as a prescribed time period has elapsed since a time point when a time stamp token was previously obtained, the hardware processor generates the terminal value.

6. The data management apparatus according to claim 1, wherein
   the information on the record at the terminal in the first distributed ledger is a hash value of the record at the terminal in the first distributed ledger, and
   the information on the record at the terminal in the second distributed ledger is a hash value of the record at the terminal in the second distributed ledger.

7. The data management apparatus according to claim 1, wherein
the first information is a hash value of the first data, and
the second information is a hash value of the second data.

8. A data management method by a data management apparatus that manages data based on a distributed ledger technology,
the data management apparatus including
a storage device where a distributed ledger is stored, in the distributed ledger, a record including information on the data being stored in a time-series manner,
a controller that adds the record to the distributed ledger, and
a communication apparatus configured to communicate with a time stamp authority,
the data including first data and second data,
the distributed ledger including
a first distributed ledger where a record including first information on the first data is stored in a time-series manner, and
a second distributed ledger where a record including second information on the second data is stored in a time-series manner, the data management method comprising:
generating a terminal value including information on a record at a terminal in the first distributed ledger and information on a record at a terminal in the second distributed ledger; and
obtaining a time stamp token for the terminal value from the time stamp authority through the communication apparatus.

* * * * *